(12) United States Patent
Saber et al.

(10) Patent No.: US 12,363,709 B2
(45) Date of Patent: *Jul. 15, 2025

(54) ACK-NACK PUCCH DROPPING SCHEMES FOR TDD CELL

(71) Applicant: Samsung Electronics Co., Ltd., Suwon-si (KR)

(72) Inventors: Hamid Saber, San Diego, CA (US); Jung Hyun Bae, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,160

(22) Filed: Nov. 20, 2023

(65) Prior Publication Data

US 2024/0089966 A1 Mar. 14, 2024

Related U.S. Application Data

(63) Continuation of application No. 17/499,835, filed on Oct. 12, 2021, now Pat. No. 11,825,472.

(60) Provisional application No. 63/246,278, filed on Sep. 20, 2021, provisional application No. 63/226,160, filed on Jul. 27, 2021, provisional application No. 63/182,492, filed on Apr. 30, 2021, provisional application No. 63/164,521, filed on Mar. 22, 2021, provisional application No. 63/164,242, filed on Mar. 22, 2021, provisional application No. 63/137,128, filed on Jan. 13, 2021, provisional application No. 63/123,457, filed on Dec. 9, 2020.

(51) Int. Cl.
| | |
|---|---|
| *H04W 72/1273* | (2023.01) |
| *H04L 5/14* | (2006.01) |
| *H04W 72/0446* | (2023.01) |
| *H04W 72/23* | (2023.01) |
| *H04W 72/566* | (2023.01) |

(52) U.S. Cl.
CPC ....... *H04W 72/1273* (2013.01); *H04L 5/1469* (2013.01); *H04W 72/0446* (2013.01); *H04W 72/23* (2023.01); *H04W 72/569* (2023.01)

(58) Field of Classification Search
CPC .......... H04W 72/1273; H04W 72/569; H04W 72/23; H04W 72/0446; H04L 5/1469
See application file for complete search history.

(56) References Cited

U.S. PATENT DOCUMENTS

| | | | | |
|---|---|---|---|---|
| 11,825,472 | B2 * | 11/2023 | Saber | H04L 1/189 |
| 2020/0053757 | A1 * | 2/2020 | Bagheri | H04L 5/10 |
| 2020/0106559 | A1 * | 4/2020 | Vilaipornsawai | H04L 1/1896 |
| 2020/0204312 | A1 * | 6/2020 | Xu | H04W 36/085 |
| 2020/0314881 | A1 * | 10/2020 | Bagheri | H04L 5/0051 |
| 2020/0367208 | A1 * | 11/2020 | Khoshnevisan | H04W 72/23 |
| 2020/0389897 | A1 * | 12/2020 | Mondal | H04L 5/0044 |
| 2022/0046677 | A1 * | 2/2022 | Talarico | H04W 72/23 |
| 2022/0085918 | A1 * | 3/2022 | Luo | H04L 1/1893 |
| 2022/0095363 | A1 * | 3/2022 | Elshafie | H04L 1/1864 |
| 2022/0232613 | A1 * | 7/2022 | Gao | H04L 1/1887 |

(Continued)

*Primary Examiner* — Jael M Ulysse
(74) *Attorney, Agent, or Firm* — Renaissance IP Law Group LLP

(57) ABSTRACT

Methods are disclosed for enhanced Physical Uplink Control Channel (PUCCH) transmission for 3$^{rd}$ Generation Partnership Project (3GPP) new radio (NR) technologies.

20 Claims, 19 Drawing Sheets

(56) References Cited

U.S. PATENT DOCUMENTS

2022/0311545 A1* 9/2022 Sun ........................ H04L 1/1812
2023/0045971 A1* 2/2023 Kim ...................... H04L 5/0044
2023/0073095 A1* 3/2023 Kim .................... H04W 72/231

* cited by examiner

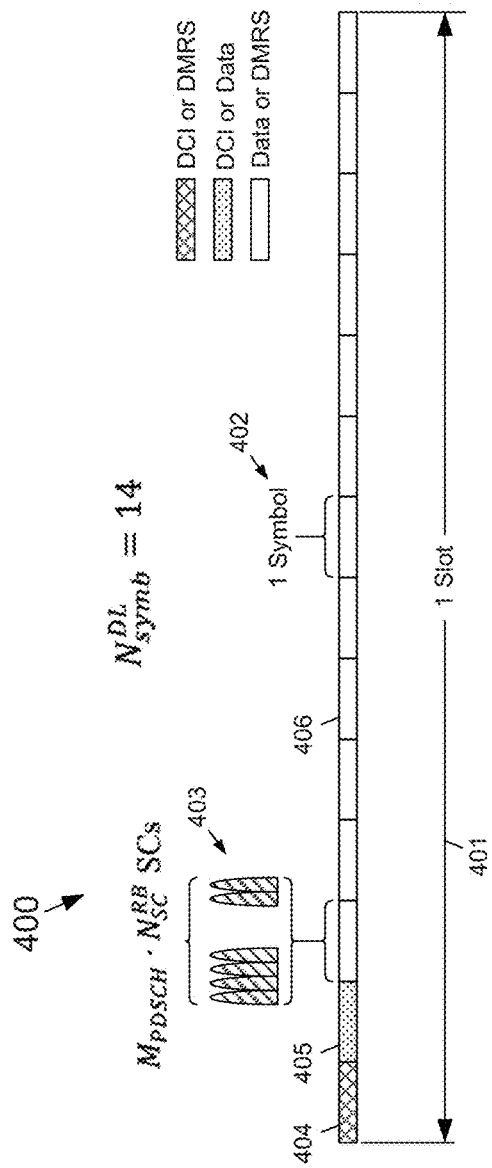
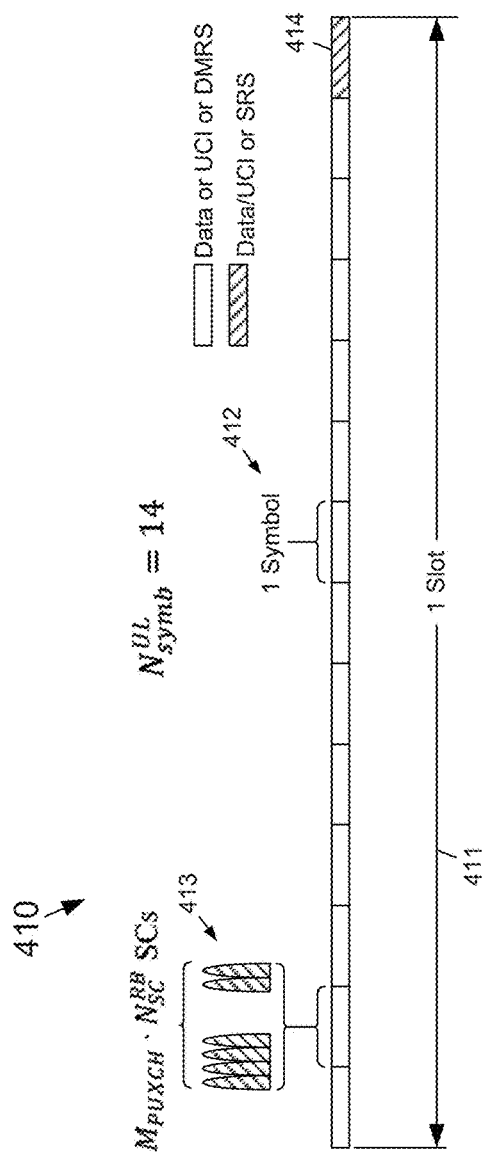
FIG. 4A
FIG. 4B

ACK-NACK PUCCH DROPPING SCHEMES FOR TDD CELL

CROSS-REFERENCE TO RELATED APPLICATION

This application is a continuation of U.S. patent application Ser. No. 17/499,835, filed on Oct. 12, 2021, which claims the priority benefit under 35 U.S.C. § 119(e) of U.S. Provisional Patent Application Ser. No. 63/123,457, filed on Dec. 9, 2020, U.S. Provisional Patent Application Ser. No. 63/137,128, filed on Jan. 13, 2021, U.S. Provisional Patent Application Ser. No. 63/164,242, filed on Mar. 22, 2021, U.S. Provisional Patent Application Ser. No. 63/164,521, filed on Mar. 22, 2021, U.S. Provisional Patent Application Ser. No. 63/182,492, filed on Apr. 30, 2021, U.S. Provisional Patent Application Ser. No. 63/226,160, filed on Jul. 27, 2021, and U.S. Provisional Patent Application Ser. No. 63/246,278, filed on Sep. 20, 2021, the disclosures of which are incorporated herein by reference in their entirety.

TECHNICAL FIELD

The subject matter disclosed herein generally relates to wireless communication systems. More particularly, the subject matter disclosed herein relates to acknowledgement/no acknowledgement dropping techniques for time-division duplex communication cells.

BACKGROUND

In Release 15 (Rel-15) $3^{rd}$ Generation Partnership Project (3GPP) new radio (NR) technology, downlink traffic can be either dynamic grant (DG) physical downlink shared channel (PDSCH) or semi-persistently scheduled (SPS) PDSCH. A DG-PDSCH is always scheduled by a scheduling physical downlink control channel (PDCCH) that conveys downlink control information (DCI) to the user equipment (UE). The DCI includes, among other information, the time and frequency resources in which a UE can receive the PDSCH. Every DG-PDSCH can only be received by receiving the scheduling DCI.

It is also possible for a UE to receive a PDSCH without a scheduling a DCI by using a SPS PDSCH. With a SPS PDSCH, a logical 5G radio node, such as a gNB, configures a UE with one or more SPS configurations via radio resource control (RRC) messages. A SPS configuration information element (IE) per serving cell per bandwidth part (BWP) includes periodicity, physical uplink control channel (PUCCH) resource information and other information required for SPS operation.

Multiple input multiple output (MIMO) transmission schemes have been widely used in digital communication to increase the capacity of wireless channel. 3GPP mobile communication standard support MIMO transmission schemes in which a physical downlink shared channel (PDSCH) or physical uplink shared channel (PUSCH) among other types of channels and signals may be transmitted from different physical antenna or different antenna ports.

Different antenna ports of a MIMO transmission scheme may be from within a single transmission and reception point (TRP) in which case the scheme is referred to as single TRP transmission scheme. Different antenna ports of one or different channels may also be within multiple TRPs that are typically non-co-located in which case the scheme is referred to as a Multi-TRP (M-TRP) scheme. An example of such scenario is when a rank-2 PDSCH is transmitted by two antenna ports where the first port is within TRP1 and the second port is within TRP2.

M-TRP transmissions may be categorized into single-DCI and multi-DCI M-TRP. With single-DCI M-TRP, a single PDCCH is transmitted from one of the TRPs and schedules one or multiple PDSCHs. In one transmission scheme, different layers of a single PDSCH are transmitted from different TRPs. In other transmission schemes multiple PDSCHs (multiplexed in time or frequency domain) with the same transport block (TB) are transmitted in which all the layers of a PDSCH are transmitted from one of the TRPs. Different PDSCHs among the multiple ones may be transmitted from different TRPs according to a pattern. With multi-DCI M-TRP, each TRP transmits its own PDCCH that schedules a PDSCH, which is also transmitted from the ports within the same TRP. A single DCI (PDCCH) may be transmitted from a first TRP and schedules a PDSCH with two layers, layer #1 and layer #2. Layer #1 may be transmitted from an antenna port #1 within the first TRP while layer #2 may be transmitted from an antenna port #2 within a second TRP. There are different S-DCI transmission schemes in which the scheduled PDSCH may be associated with two different TCI states.

One important scenario for uRLLC service type in NR is deployment in TDD cell. Unlike Frequency-Division Duplex (FDD), in a Time-Division Duplex (TDD) cell, not all slots/symbols are available for uplink transmission. A different control mechanism may be used by a gNB to specify a TDD pattern. In particular, semi-static TDD configuration via RRC determines the set of UL/DL and Flexible symbols either as cell-specific system information or a UE specific RRC configuration. A gNB may further determine a TDD pattern via a dynamic slot format indicator (SFI) DCI format.

Unlike a DG PDSCH in which A/N timing may be typically indicated dynamically and in which a gNB may avoid collision of A/N PUCCH with TDD DL symbols, the A/N timing of the SPS PDSCH is semi-statically configured via the network. With the introduction of multiple SPS configurations per BWP and different periodicities of the SPS configurations, it may be practically unavoidable that some SPS A/N would be transmitted on some invalid symbols according to a TDD configuration. The system performance degradation due to dropping of SPS A/N PUCCH may be significant. Therefore some an enhancement is under discussion in Rel-17 industrial internet of things (IIoT) and uRLLC (IIoT/uRLLC) work item. As parts of the enhancement, a SPS A/N PUCCH that a UE might drop in Rel-16/16, is postponed to "a first available" PUCCH resource.

SUMMARY

An example embodiment provides a method for enhanced PUCCH transmission in a wireless communication network in which the method may include: receiving, by a device, a first PDSCH over the wireless communication network that may include a SPS PDSCH in which the SPS PDSCH may indicate a first PDSCH resource and a first PUCCH resource for transmitting a first acknowledgement message for the first PDSCH resource in a PUCCH time slot m that is subsequent to the first PDSCH and in which the first acknowledgement message may include a first priority; receiving, by the device, a second PDSCH over the wireless communication network having a start that is subsequent to a start of the first PDSCH resource and that indicates a second PDSCH resource and a second PUCCH resource for transmitting a second acknowledgement message for the second PDSCH resource in a PUCCH time slot p that is subsequent to the time slot m in which the second acknowledgement message may include a second priority; and transmitting, by the device, the first acknowledgement message over the wireless communication network in a PUCCH time slot n that is subsequent to the time slot m by the device deferring transmission of the first acknowledgement message from the time slot m based on a collision in slot m with at least one invalid symbol due to a TDD Uplink/Downlink (UL/DL) configuration. In one embodiment, the time slot n is subsequent to the time slot p, and the first priority equals the second priority. In another embodiment, the time slot p is subsequent to the time slot n, and the first priority equals the second priority. In still another embodiment, the second PUCCH resource ends prior to a start of the first PUCCH resource, and the first priority is different from the second priority. In yet another embodiment, the time slot p is subsequent to the time slot n, the second PUCCH resource does not end prior to a start of the first PUCCH resource, and the first priority is different from the second priority.

An example embodiment provides a method for enhanced PUCCH transmission in a wireless communication network in which the method may include: receiving, by a device, a first PDSCH over the wireless communication network that indicates $N_{rep}$ PUCCH resources for transmitting a first acknowledgement message for the first PDSCH resource in PUCCH time slots n to $n+(N_{rep}-1)$ in which $N_{rep}$ is an integer greater than 1; and transmitting, by the device, of the first acknowledgement message over the wireless communication network in a time slot k. In one embodiment, the time slot k may include a first available time slot that is subsequent to the time slot $n+(N_{rep}-1)$. In another embodiment, transmitting, by the device, of the first acknowledgement message in the time slot k may be based on $N_{rep}$ PUCCH resources being dropped. In still another embodiment, transmitting, by the device, of the first acknowledgement message in the time slot k may be based on at least one PUCCH resource being dropped. In yet another embodiment, transmitting, by the device, of the first acknowledgement message in the time slot k may be based on M PUCCH resources being dropped in which M may be equal to 1 to $N_{rep}$. In one embodiment, transmitting, by the device, of the first acknowledgement message may further included transmitting, by the device, the first acknowledgement message over the wireless communication network in M PUCCH resources based on M PUCCH resources being dropped in which M comprises 1 to $N_{rep}$. In another embodiment, transmitting, by the device, of the first acknowledgement message further comprises transmitting, by the device, the first acknowledgement message over the wireless communication network in a time slot k that may be prior to an end of the time slots n to $n+(N_{rep}-1)$.

An example embodiment provides a method for enhanced M-TRP PUCCH transmission in a wireless communication network in which the method may include: receiving, at a device, M occasions of a PDSCH in a single DCI M-TRP scheme having a slot-based repetition in N time slots in which N may be an integer greater than 1, in which the PDSCH is associated with two TCI states, and in which M≤N; and determining, at the device, TCI states of the M occasions based on a dynamic grant single-DCI M-TRP PDSCH with slot-based repetition. In one embodiment, the PDSCH may include a SPS PDSCH. In another embodiment, the PDSCH may include a dynamic grant PDSCH. In still another embodiment, M=N, and determining, at the device, TCI states may further include determining, at the device, N valid time slots each having valid symbols. In still another embodiment, the N occasions end after a predetermined deferral time $T_{deferral}^{max}$ from an end of a last symbol of an occasion in time slot N. In yet another embodiment, the method may further include transmitting, by the device, an acknowledgement message over the wireless communication network for the PDSCH based on a predetermined number of time slots from a last received PDSCH occasion.

An example embodiment provides a method for enhanced PUCCH transmission in a wireless communication network in which the method may include: determining, at a device, a PUCCH over the wireless communication network with acknowledgement information for a SPS PDSCH or a first dynamic grant PDSCH scheduled by a first PDCCH and a first PUCCH resource with HARQ-ACK information on a first PUCCH cell with SCS numerology of $\mu_1$; determining subsequently, at the device, a second DCI by a second PDCCH indicating a second PUCCH resource on a second PUCCH cell with SCS numerology of $\mu_2$ for multiplexing bits of the first and a second acknowledgement message; and transmitting the first acknowledgement message without multiplexing bits of the second acknowledgement message based on the second PDCCH not ending earlier than $N_3 \cdot (2048+144) \cdot \kappa \cdot 2^{-\mu} \cdot T_c$ from a start of a first symbol of the first PUCCH resource in which $\mu$ may be a smallest SCS numerology between the second PDCCH, the first PUCCH cell and the second PUCCH cell, $N_3 \cdot (2048+144) \cdot \kappa \cdot 2^{-\mu} \cdot T_c$ may be in units of seconds, and $T_c = 1/(\Delta f_{max} \cdot N_f)$ in which $\Delta f_{max} = 480 \cdot 10^3$ Hz and $N_f = 4096$, and $\kappa = T_s/T_c = 64$ in which $T_s = 1/(f_{ref} \cdot N_{f,ref})$, $\Delta f_{ref} = 15 \cdot 10^3$ Hz and $N_{f,ref} = 2048$. In one embodiment, $\mu$ may further include a smallest SCS numerology between the second PDCCH, and the first PUCCH cell, if any, and the second PUCCH cell.

An example embodiment provides a method for enhanced PUCCH transmission in a wireless communication network in which the method may include: detecting, at a device, a first PDCCH that schedules a dynamic grant PDSCH and a PUCCH resource with a first acknowledgement message on a first PUCCH cell; detecting subsequently, at the device, a DCI via reception of a second PDCCH indicating a second PUCCH resource with a second acknowledgment message on a second PUCCH cell in which the second PUCCH cell and the first PUCCH cell may be different, and the first acknowledgement message and the second acknowledgement message may belong to a same codebook, and remaining, at the device, at a same PUCCH carrier based on the second PUCCH cell and the first PUCCH cell being different, and the first acknowledgement message and the second acknowledgement message belonging to a same codebook.

An example embodiment provides a method for enhanced PUCCH transmission in a wireless communication network in which the method may include: detecting, at a device, a first PDCCH that schedules a dynamic grant PDSCH and a PUCCH resource with a first acknowledgement message on a first PUCCH cell having a numerology $\mu_1$; detecting subsequently, at the device, a Downlink Control Information (DCI) via reception of a second PDCCH indicating a second PUCCH resource with a second acknowledgment message on a second PUCCH cell having a numerology $\mu_2$ in which $\mu_1$ may be different from to $\mu_2$, and the first acknowledgement message and the second acknowledgement message may belong to a same codebook, and remaining, at the device, at a same PUCCH carrier based on $\mu_1$ being different from to $\mu_2$, and the first acknowledgement message and the second acknowledgement message belonging to a same codebook.

An example embodiment provides a method in a wireless communication network in which the method may include: configuring a device with M PUCCH cells each having a same or a different numerology; receiving, at the device, a first DCI scheduling a first PDSCH; receiving, at the device, a second DCI scheduling a second PDSCH; and determining that the first PDSCH and the second PDSCH are within a same acknowledgement message codebook based corresponding PUCCH resources being within a same slot of a PUCCH cell having a smallest numerology among the M PUCCH cells.

BRIEF DESCRIPTION OF THE DRAWING

In the following section, the aspects of the subject matter disclosed herein will be described with reference to exemplary embodiments illustrated in the figures, in which:

FIG. 4A depicts an example embodiment of a downlink slot structure;

FIG. 4B depicts an example embodiment of an uplink slot structure for physical uplink shared channel transmission or physical uplink control channel transmission;

DETAILED DESCRIPTION

Figure 1:
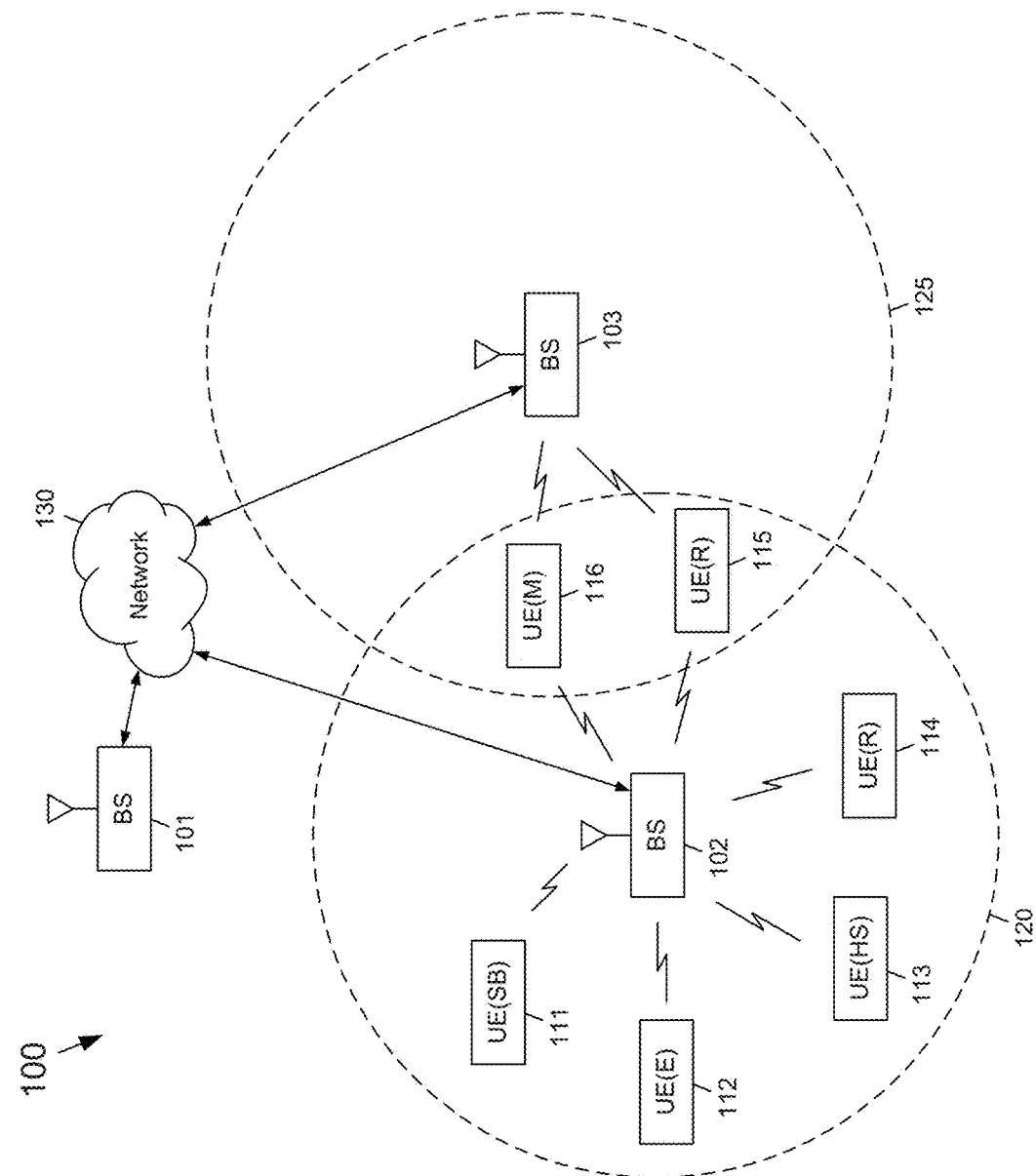
FIG. 1 depicts an example embodiment of a wireless communication network according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

FIGS. 1-27, described below, and the various embodiments used to illustrate the subject matter disclosed herein are only by way of example and should not be construed in any way to limit the scope of the subject matter disclosed herein. It should be understood that the subject matter disclosed herein may be implemented in any suitably arranged system or device.

At least the following documents are hereby incorporated by reference into the present disclosure as if fully set forth herein: 3GPP TS 38.211 v15.6.0, "NR; Physical channels and modulation;" 3GPP TS 38.212 v15.6.0, "NR; Multiplexing and Channel coding;" 3GPP TS 38.213 v15.6.0, "NR; Physical Layer Procedures for Control;" 3GPP TS 38.214 v15.6.0, "NR; Physical Layer Procedures for Data;" 3GPP TS 38.321 v15.6.0, "NR; Medium Access Control (MAC) protocol specification;" and 3GPP TS 38.331 v15.6.0, "NR; Radio Resource Control (RRC) Protocol Specification."

FIGS. 1-5 depict various example embodiments implemented in wireless communications systems and use of orthogonal frequency division multiplexing (OFDM) or orthogonal frequency division multiple access (OFDMA) communication techniques. The descriptions of FIGS. 1-5 are not meant to imply physical or architectural limitations to the manner in which different embodiments may be implemented. Different embodiments of the subject matter disclosed herein may be implemented in any suitably-arranged communications system.

FIG. 1 depicts an example embodiment of a wireless communication network 100 according to the subject matter disclosed herein. The example embodiment of the wireless network depicted in FIG. 1 is for illustration only. Other embodiments of the wireless network 100 may be used without departing from the principles of the subject matter disclosed herein.

As depicted in FIG. 1, the wireless network 100 includes a gNB 101 (e.g., base station, BS), a gNB 102, and a gNB 103. The gNB 101 may communicate with the gNB 102 and the gNB 103. The gNB 101 may also communicate with at least one network 130, such as the internet, a proprietary Internet Protocol (IP) network, or other data network.

The gNB 102 may provide wireless broadband access to the network 130 for a first plurality of UEs within a coverage area 120 of the gNB 102. The first plurality of UEs may include a UE 111 that may be located in a small business (SB); a UE 112 that may be located in an enterprise I; a UE 113 that may be located in a WiFi hotspot (HS); a UE 114 that may be located in a first residence I; a UE 115 that may be located in a second residence I; and a UE 116 that may be a mobile device (M), such as, but not limited to, a cell phone, a wireless laptop, a wireless PDA, or the like. The gNB 103 may provide wireless broadband access to the network 130 for a second plurality of UEs within a coverage area 125 of the gNB 103. The second plurality of UEs may include the UE 115 and the UE 116. In some embodiments, one or more of the gNBs 101-103 may communicate with each other and with the UEs 111-116 using 5G/NR, LTE, LTE-A, WiMAX, WiFi, and/or other wireless communication techniques.

Depending on the network type, the term "base station" or "BS" may refer to any component (or collection of components) configured to provide wireless access to a network, such as a transmit point (TP), a transmit-receive point (TRP), an enhanced base station (eNodeB or eNB), a 5G/NR base station (gNB), a microcell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably herein to refer to network infrastructure components that provide wireless access to remote terminals. Also, depending on the network type, the term "user equipment" or "UE" may refer to any component such as "mobile station," "subscriber station," "remote terminal," "wireless terminal," "receive point," or "user device." For the sake of convenience, the terms "user equipment" and "UE" may be used herein to refer to remote wireless equipment that wirelessly accesses a BS, whether the UE is a mobile device (such as, but not limited to, a mobile telephone or smartphone) or is normally considered a stationary device (such as, but not limited to, a desktop computer or vending machine).

Dotted lines depict approximate extents of the coverage areas 120 and 125, which are depicted as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 may include circuitry, programming, or a combination thereof, for efficient control signaling designed for improved resource utilization. In certain embodiments, and one or more of the gNBs 101-103 may include circuitry, programming, or a combination thereof, for efficient control signaling designed for improved resource utilization.

Although FIG. 1 depicts one example of a wireless network, various changes may be made to FIG. 1. For example, the wireless network 100 could include any number of gNBs and any number of UEs in any suitable arrangement. Also, the gNB 101 may communicate directly with any number of UEs and provide those UEs with wireless broadband access to the network 130. Similarly, each gNB 102-103 may communicate directly with the network 130 and provide UEs with direct wireless broadband access to the network 130. Further, the gNBs 101, 102, and/or 103 may provide access to other or additional external networks, such as, but not limited to, external telephone networks or other types of data networks.

Figure 2:
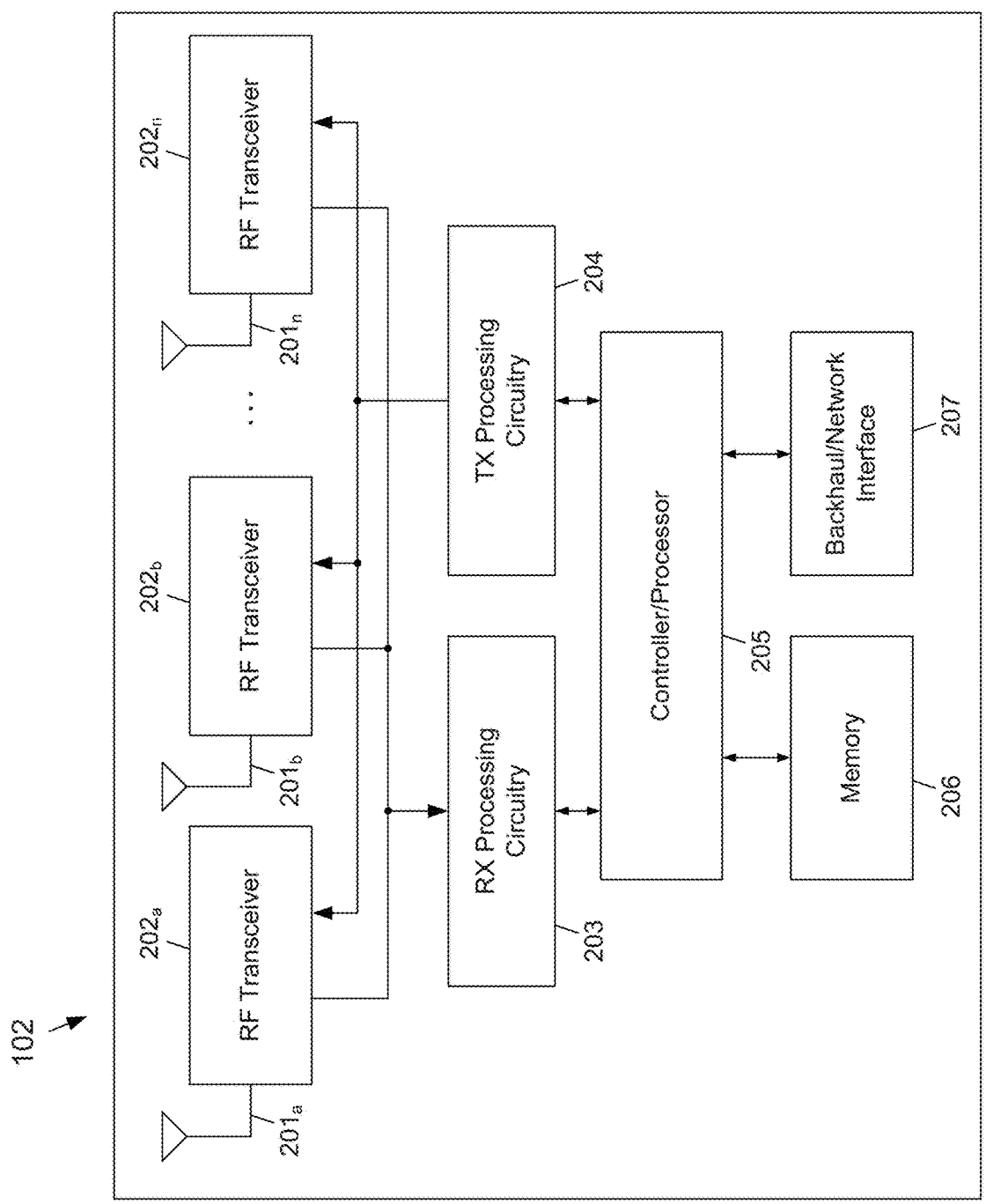
FIG. 2 depicts an example embodiment of a base station device according to the subject matter disclosed herein.

FIG. 2 depicts an example embodiment of the gNB 102 according to the subject matter disclosed herein. The embodiment of the gNB 102 depicted in FIG. 2 is for illustration only, and the gNBs 101 and 103 of FIG. 1 may have the same or a similar configuration. However, gNBs come in a wide variety of configurations, and it should be understood that FIG. 2 does not limit the scope of the subject matter disclosed herein to any particular implementation of a gNB.

As depicted in FIG. 2, the gNB 102 may include multiple antennas 201a-201n, multiple radio frequency (RF) transceivers 202a-202n, receive (RX) processing circuitry 203, and transmit (TX) processing circuitry 204. The gNB 102 may also include a controller/processor 205, a memory 206, and/or a backhaul or network interface 207. The TX processing circuitry 204 may include a controller/processor that is not shown and that controls the TX processing circuitry 204 to perform transmission-related functionality as disclosed herein. Alternatively, the controller/processor 205 may be configured to control the TX processing circuitry 204 to perform transmission-related functionality as disclosed herein.

The RF transceivers 202a-202n may receive incoming RF signals from the antennas 201a-201n. The received RF signals may be signals transmitted by UEs in the network 100. The RF transceivers 202a-202n may down-convert the incoming RF signals to generate IF or baseband signals. The IF or baseband signals may be sent to the RX processing circuitry 203, which generates processed baseband signals by filtering, decoding, and/or digitizing the baseband or IF signals. The RX processing circuitry 203 may transmit the processed baseband signals to the controller/processor 255 for further processing.

The TX processing circuitry 204 may receive analog or digital data (such as, but not limited to, voice data, web data, e-mail, or interactive video game data) from the controller/processor 225. The TX processing circuitry 204 may encode, multiplex, and/or digitize the outgoing baseband data to generate processed baseband or IF signals. The RF transceivers 202a-202n may receive the outgoing processed baseband or IF signals from the TX processing circuitry 204 and may up-convert the baseband or IF signals to RF signals that are transmitted via the antennas 201a-201n. The TX processing circuitry 204 may be configured so that one or more beams are transmitted via the antennas 201a-201n The controller/processor 205 may include one or more processors or other processing devices that may control the overall operation of the gNB 102. For example, the controller/processor 205 may control the reception of forward channel signals and the transmission of reverse channel signals by the RF transceivers 202a-202n, the RX processing circuitry 203, and the TX processing circuitry 204 in accordance with well-known principles. The controller/processor 205 may support additional functions as well, such as more advanced wireless communication functions. For instance, the controller/processor 205 may support beamforming or directional-routing operations in which outgoing/incoming signals from/to multiple antennas 201a-201n may be weighted differently to effectively steer the outgoing signals in a desired direction. Any of a wide variety of other functions may be supported in the gNB 102 by the controller/processor 205.

The controller/processor 205 may also be capable of executing programs and other processes resident in the memory 206, such as an operating system (OS). The controller/processor 205 may move data into or out of the memory 206, which may be coupled to the controller/processor 205, as required by an executing process. Part of the memory 206 may include a random-access memory (RAM), and another part of the memory 206 may include a flash memory or other read-only memory (ROM).

The controller/processor 205 may also be coupled to the backhaul or network interface 207. The backhaul or network interface 207 may allow the gNB 102 to communicate with other devices or systems over a backhaul connection or over a network. The interface 207 may support communications over any suitable wired or wireless connection(s). For example, when the gNB 102 is implemented as part of a cellular communication system (such as a gNB supporting 5G/NR, LTE, or LTE-A), the interface 207 may allow the gNB 102 to communicate with other gNBs over a wired or wireless backhaul connection. When the gNB 102 is implemented as an access point, the interface 207 may allow the gNB 102 to communicate over a wired or wireless local area network or over a wired or wireless connection to a larger network (such as the internet). The interface 207 may include any suitable structure supporting communications over a wired or wireless connection, such as an Ethernet or an RF transceiver.

Although FIG. 2 depicts one example of gNB 102, various changes may be made to FIG. 2. For example, the gNB 102 may include any number of each component shown in FIG. 2. As a particular example, an access point may include a number of interfaces 207, and the controller/processor 205 may support routing functions to route data between different network addresses. As another particular example, while shown as including a single instance of TX processing circuitry 204 and a single instance of RX processing circuitry 203, the gNB 102 may include multiple instances of each (such as one per RF transceiver). Also, various components in FIG. 2 may be combined, further subdivided, or omitted and additional components may be added according to particular needs. It should be understood that the example gNB 102 depicted in FIG. 2 may be configured to provide any and all of the functionality of a base station device and/or a gNB described herein.

Figure 3:
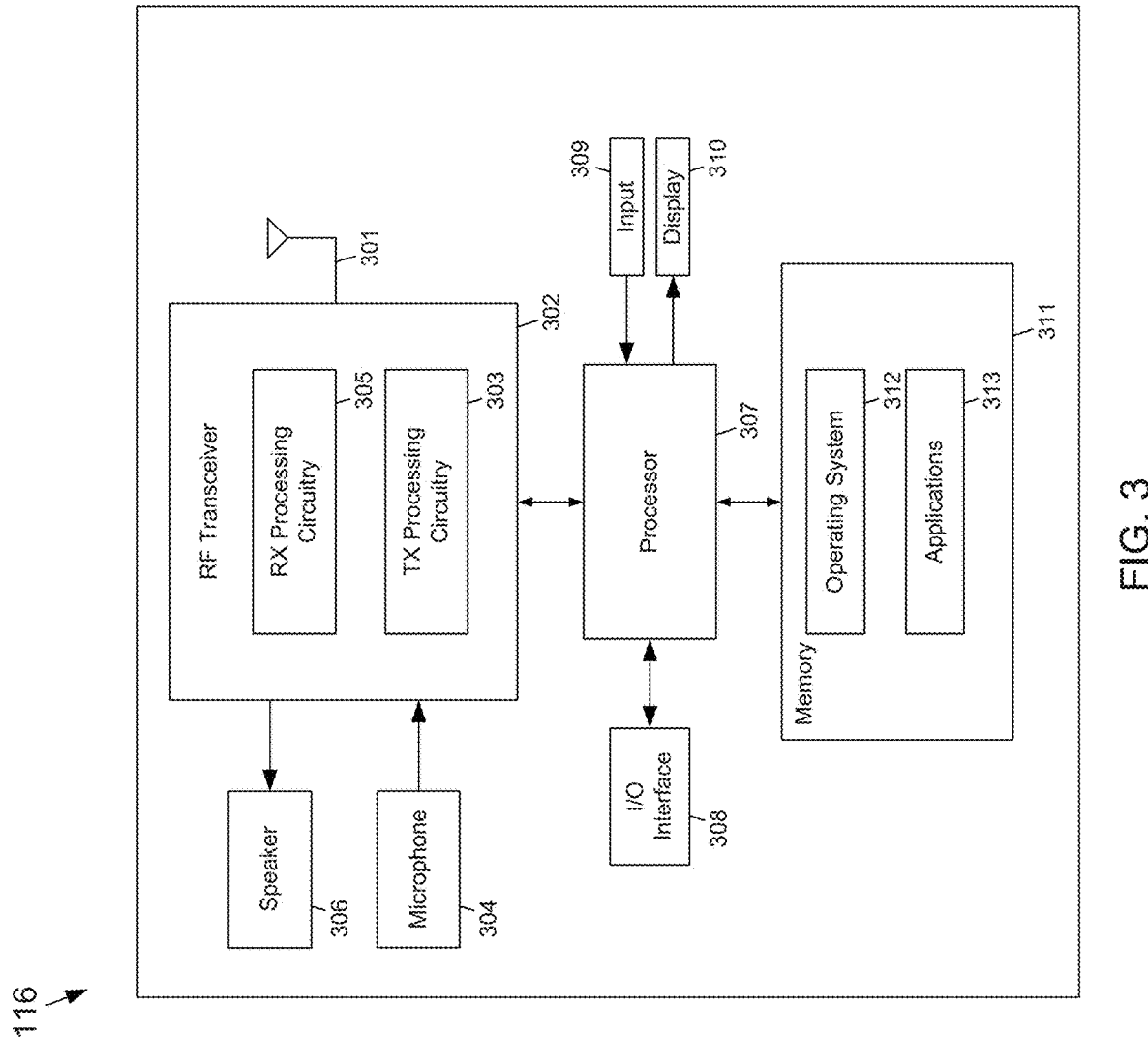
FIG. 3 depicts an example embodiment of a user equipment according to the subject matter disclosed herein.

FIG. 3 depicts an example embodiment of UE 116 according to the subject matter disclosed herein. The embodiment of the UE 116 depicted in FIG. 3 is for illustration only, and the UEs 111-115 of FIG. 1 could have the same or similar configuration. UEs, however, may come in a wide variety of configurations, and FIG. 3 does not limit a UE to be any particular implementation of a UE.

As depicted in FIG. 3, the UE 116 may include one or more antennas 301, an RF transceiver 302, TX processing circuitry 303, a microphone 304, and RX processing circuitry 305. The UE 116 may also include a speaker 360, a processor 307, an input/output (I/O) interface (IF) 308, a touchscreen 309 (or other input device), a display 310, and a memory 311. The memory 311 may include an OS 312 and one or more applications 313. The TX processing circuitry 303 may include a controller/processor that is not shown and that may be configured to control the TX processing circuitry 303 to perform transmission-related functionality as disclosed herein. Alternatively, the processor 307 may be configured to control the TX processing circuitry 303 to perform transmission-related functionality as disclosed herein.

The RF transceiver 310 may receive an incoming RF signal, from the antenna 305 that has been transmitted by a gNB of the network 100. The RF transceiver 310 may down-convert the incoming RF signal to generate an intermediate frequency (IF) or baseband signal. The IF or baseband signal may be sent to the RX processing circuitry 325, which generates a processed baseband signal by filtering, decoding, and/or digitizing the baseband or IF signal. The RX processing circuitry 325 may transmit the processed baseband signal to the speaker 330 (such as for voice data) or to the processor 340 for further processing (such as for web browsing data).

The TX processing circuitry 303 may receive analog or digital voice data from the microphone 304 or other outgoing baseband data (such as web data, e-mail, or interactive video game data) from the processor 307. The TX processing circuitry 303 may encode, multiplex, and/or digitize the outgoing baseband data to generate a processed baseband or IF signal. The RF transceiver 302 may receive the outgoing processed baseband or IF signal from the TX processing circuitry 303 and up-convert the baseband or IF signal to an RF signal that is transmitted via the one or more antennas 301. The TX processing circuitry 303 may be configured to transmit one or more beams from the one or more antennas 301

The processor 307 may include one or more processors or other processing devices and may execute the OS 312 stored in the memory 311 in order to control the overall operation of the UE 116. For example, the processor 307 may control the reception of forward channel signals and the transmission of reverse channel signals by the RF transceiver 302, the TX processing circuitry 303, and the RX processing circuitry 305 in accordance with well-known principles. In some embodiments, the processor 307 may at least one microprocessor or microcontroller.

The processor 370 may also be capable of executing other processes and programs resident in the memory 311, such as processes for beam management. The processor 307 may move data into or out of the memory 311 as required by an executing process. In some embodiments, the processor 307 may be configured to execute the applications 313 based on the OS 361 or in response to signals received from gNBs or from an operator. The processor 307 may also be coupled to the I/O interface 308, which may provide the UE 116 with the ability to connect to other devices, such as, but not limited to, laptop computers and handheld computers. The I/O interface 308 is the communication path between these accessories and the processor 307.

The processor 307 may also be coupled to the touchscreen 309 and the display 310. An operator of the UE 116 may use the touchscreen 309 to enter data into the UE 116. The display 310 may be a liquid crystal display, light emitting diode display, or other display capable of rendering text and/or at least limited graphics, such as from web sites.

The memory 311 may be coupled to the processor 307. Part of the memory 311 may include RAM and another part of the memory 311 may include a flash memory or other ROM.

Although FIG. 3 depicts one example embodiment of the UE 116, various changes may be made to FIG. 3. For example, various components in FIG. 3 may be combined, further subdivided, or omitted and additional components may be added according to particular needs. As a particular example, the processor 340 may be divided into multiple processors, such as one or more central processing units (CPUs) and one or more graphics processing units (GPUs). Also, while FIG. 3 depicts the UE 116 configured as a mobile telephone or smartphone, UEs may be configured to operate as other types of mobile or stationary devices. It should be understood that the example UE 116 depicted in FIG. 3 may be configured to provide any and all of the functionality of a UE described herein.

To meet the demand for wireless data traffic that has increased since deployment of 4G communication systems, efforts have been made to develop an improved 5G/NR or pre-5G/NR communication system. Therefore, the 5G/NR or pre-5G/NR communication system may be also referred to as a "beyond 4G network" or a "post LTE system." The 5G/NR communication system may be considered to be implemented in higher frequency (mmWave) bands, e.g., 28 GHz or 60 GHz bands or, in general, above 6 GHz bands, to accomplish higher data rates or in lower frequency bands, such as below 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques as used in 5G/NR communication systems. Additionally, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system may include a downlink (DL) that refers to transmissions from a base station or one or more transmission points to UEs and an uplink (UL) that refers to transmissions from UEs to a base station or to one or more reception points.

A unit for DL signaling or for UL signaling on a cell may be referred to as a slot and may include one or more symbols. A symbol may also serve as an additional time unit. A frequency (or bandwidth (BW)) unit may be referred to as a resource block (RB). One RB may include a number of sub-carriers (SCs). For example, a slot may have duration of 0.5 milliseconds or 1 millisecond, include 14 symbols, and an RB may include 12 SCs with inter-SC spacing of 30 kHz or 15 kHz, respectively. A unit of one RB in frequency and one symbol in time may be referred to as physical RB (PRB).

DL signals may include data signals conveying information content, control signals conveying DL control information (DCI), and reference signals (RS) that may also be known as pilot signals. A gNB transmits data information or DCI through respective physical DL shared channels (PDSCHs) or physical DL control channels (PDCCHs). A PDSCH or a PDCCH may be transmitted over a variable number of slot symbols including one slot symbol. For brevity, a DCI format scheduling a PDSCH reception by a UE may be referred to as a DL DCI format and a DCI format scheduling a PUSCH transmission from a UE is referred to as an UL DCI format.

A gNB may transmit one or more of multiple types of RS including channel state information RS (CSI-RS) and demodulation RS (DM-RS). A CSI-RS may be primarily intended for UEs to perform measurements and provide channel state information (CSI) to a gNB. For channel measurement, non-zero power CSI-RS (NZP CSI-RS) resources may be used. For interference measurement reports (IMRs), CSI interference measurement (CSI-IM) resources may be used. A CSI process may include NZP CSI-RS and CSI-IM resources.

A UE may determine CSI-RS transmission parameters through DL control signaling or higher-layer signaling, such as radio resource control (RRC) signaling, from a gNB. Transmission instances of a CSI-RS may be indicated by DL control signaling or be configured by higher layer signaling. A DM-RS may be typically transmitted only within a BW of a respective PDCCH or PDSCH and a UE may use the DM-RS to demodulate data or control information.

FIG. 4A depicts an example embodiment of a DL slot structure 400 according to the subject matter disclosed herein. The example embodiment of the DL slot structure 400 depicted in FIG. 4A is for illustration only. FIG. 4 does not limit the scope of the subject matter disclosed herein to any particular implementation. It should be noted that in the DL slot structure 400 described as follows, the DCI information need not be located as depicted in FIG. 4A and may be located elsewhere as appropriate.

As depicted in FIG. 4A, a DL slot 401 may include $N_{symb}^{DL}$ symbols 402 in which a gNB may transmit, for example, data information, DCI, or DM-RS. A DL system BW may include $N_{RB}^{DL}$ RBs. Each RB may include $N_{SC}^{RB}$ SCs. A UE may be assigned $M_{PDSCH}$ RBs for a total of $M_{SC}^{PDSCH} = M_{PDSCH} \cdot N_{SC}^{RB}$ SCs 403 for a PDSCH transmission BW. A PDCCH conveying DCI may be transmitted over control channel elements (CCEs) that are substantially spread across the DL system BW. A first slot symbol 404 may be used by the gNB to transmit PDCCH. A second slot symbol 405 may be used by the gNB to transmit PDCCH or PDSCH. Remaining slot symbols 406 may be used by the gNB to transmit PDSCH and CSI-RS. In some slots, the gNB may also transmit synchronization signals and channels that convey system information, such as synchronization signals and primary broadcast channel (SS/PBCH) blocks.

UL signals may also include data signals conveying information content, control signals conveying UL control information (UCI), DM-RS associated with data or UCI demodulation, sounding RS (SRS) enabling a gNB to perform UL channel measurement, and a random access (RA) preamble enabling a UE to perform random access. A UE may transmit data information or UCI through a respective physical UL shared channel (PUSCH) or a physical UL control channel (PUCCH). A PUSCH or a PUCCH may be transmitted over a variable number of symbols in a slot including one symbol. When a UE simultaneously transmits data information and UCI, the UE may multiplex both in a PUSCH.

A UCI may include hybrid automatic repeat request acknowledgement (HARQ-ACK) information, indicating correct or incorrect detection of data transport blocks (TBs) or of code block groups (CBGs) in a PDSCH, scheduling request (SR) indicating whether a UE has data in the buffer to the UE, and CSI reports enabling a gNB to select appropriate parameters for PDSCH or PDCCH transmissions to a UE.

A CSI report from a UE may include a channel quality indicator (CQI) informing a gNB of a largest modulation and coding scheme (MCS) for the UE to detect a TB with a predetermined block error rate (BLER), such as a 10% BLER, a precoding matrix indicator (PMI) informing a gNB how to combine signals from multiple transmitter antennas in accordance with a multiple input multiple output (MIMO) transmission principle, a CSI-RS resource indicator (CRI) indicating a CSI-RS resource associated with the CSI report, and a rank indicator (RI) indicating a transmission rank for a PDSCH.

A UL RS may include DM-RS and SRS. A DM-RS may typically be transmitted only within a BW of a respective PUSCH or PUCCH transmission. A gNB may use a DM-RS to demodulate information in a respective PUSCH or PUCCH. An SRS may be transmitted by a UE to provide a gNB with an UL CSI and, for a TDD system, an SRS transmission can also provide a PMI for DL transmission. Additionally, in order to establish synchronization or an initial higher-layer connection with a gNB, a UE may transmit a physical random-access channel (PRACH).

FIG. 4B depicts an example embodiment of a UL slot structure 410 for PUSCH transmission or PUCCH transmission according to the subject matter disclosed herein. The embodiment of the UL slot structure 410 depicted in FIG. 4B is for illustration only. FIG. 4B does not limit the scope of the subject matter disclosed herein to any particular implementation. It should be noted that in the UL slot structure 410 described as follows, the UCI information need not be located as depicted in FIG. 4B and may be located elsewhere as appropriate.

As depicted in FIG. 4B, a slot 411 may include $N_{symb}^{UL}$ symbols 412 in which a UE transmits, for example, data information, UCI, or DM-RS. An UL system BW may include N RBs. Each RB may include $N_{SC}^{RB}$. A UE may be assigned $M_{PUXCH}$ RBs for a total of $M_{SC}^{PUXCH}=M_{PUXCH}N_{SC}^{RB}$ SCs 413 for a PUSCH transmission BW ("X"="S") or for a PUCCH transmission BW ("X"="C"). The last one or more symbols of a slot may be used, for example, to multiplex SRS transmissions 414 or short PUCCH transmissions from one or more UEs.

Figure 5A:
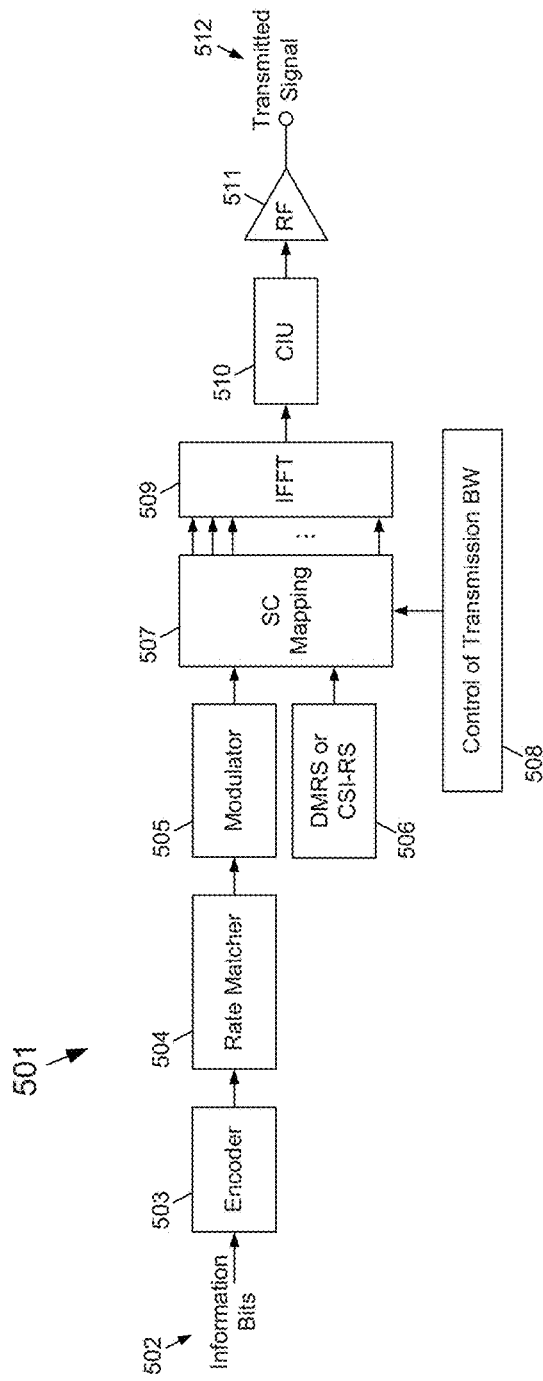
FIG. 5A depicts a block diagram of an example embodiment of a transmitter structure using OFDM according to the subject matter disclosed herein.

FIG. 5A depicts a block diagram of an example embodiment of a transmitter structure 501 using OFDM according to the subject matter disclosed herein. The embodiment of the transmitter structure 501 depicted in FIG. 5A is for illustration only and an actual implementation may have the same or a similar configuration. FIG. 5A does not limit the scope of the subject matter disclosed herein to any particular implementation.

As depicted in FIG. 5A, information bits, such as DCI bits or data information bits 502, may be encoded by an encoder module 503, rate matched to assigned time/frequency resources by a rate matcher module 504 and modulated by a modulator module 505. Subsequently, modulated encoded symbols and DM-RS or CSI-RS module 506 may be mapped to SCs by an SC mapping module 507 controlled by a transmission bandwidth module 508. An inverse fast Fourier transform (IFFT) may be performed by a filter module 509. A cyclic prefix (CP) may be added to the output of the filter module 509. The resulting signal may be filtered by common interface unit (CIU) filter module 510 and transmitted by an RF module 511 as a transmitted signal 512.

Figure 5B:
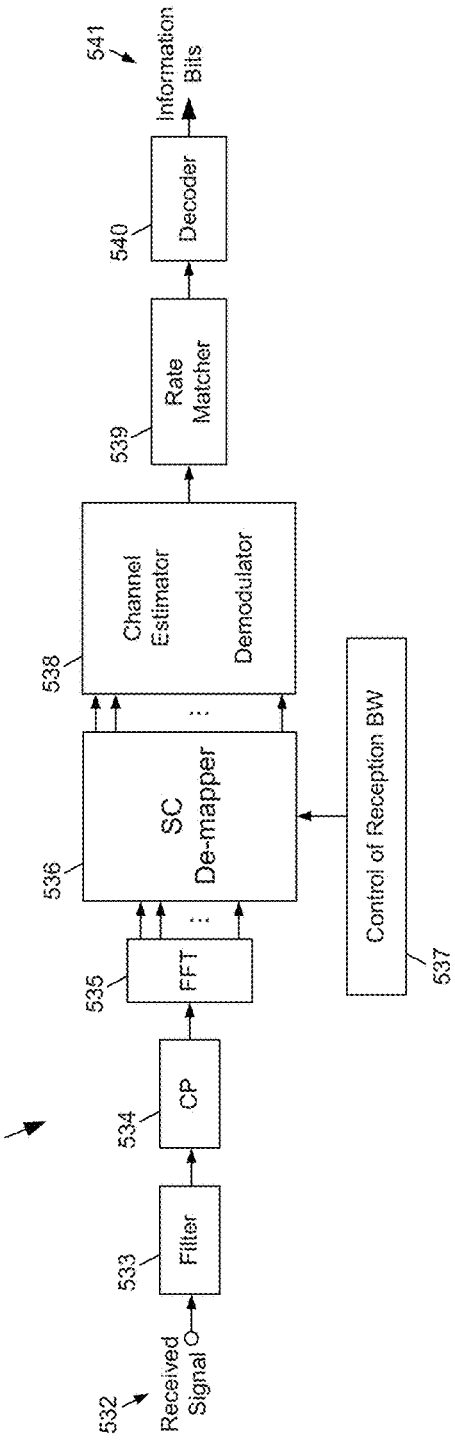
FIG. 5B depicts a block diagram of an example embodiment of an OFDM receiver structure according to the subject matter disclosed herein.

FIG. 5B depicts a block diagram of an example embodiment of an OFDM receiver structure 531 according to the subject matter disclosed herein. The embodiment of the receiver structure 531 depicted in FIG. 5B is for illustration only and an actual implementation may have the same or a similar configuration. FIG. 5B does not limit the scope of the subject matter disclosed herein to any particular implementation. As depicted in FIG. 5B, a received signal 532 may be filtered by a filter module 533. A CP removal module 534 may remove a cyclic prefix. A filter module 535 may apply a fast Fourier transform (FFT). An SC de-mapping module 536 may de-map SCs selected by BW selector module 537. Received symbols may be demodulated by a channel estimator and a demodulator module 538. A rate de-matcher module 539 may restore a rate matching, and a decoder module 540 may decode the resulting bits to provide data information bits 541. DL transmissions and UL transmissions may be based on an orthogonal frequency division multiplexing (OFDM) waveform that includes a variant using a DFT preceding that is known as DFT-spread-OFDM.

As previously mentioned, an objective in the 3GPP Rel-17 SID on RedCap NR devices is to support the same set of use cases in FR2 as in case of FR1. Beam refinement may be a key feature for FR2 operation in NR. An important issue relates to enabling a beam refinement procedure for RedCap UEs that are in an RRC_INACTIVE state (also referred to herein as a RRC Inactive state or an inactive mode). Accordingly, the subject matter disclosed herein provides a set of beam refinement procedures to enable RedCap in an inactive mode transmission in FR2.

Rel-15 3GPP NR technology, downlink traffic can be either DG PDSCH or SPS PDSCH. A DG-PDSCH is always scheduled by a scheduling PDCCH that conveys downlink DCI to a UE. The DCI includes, among other information, the time and frequency resources in which a UE can receive the PDSCH. Every DG-PDSCH can only be received by receiving the scheduling DCI.

On the other hand, to make it possible for a UE to receive a PDSCH without a scheduling a DCI, a SPS PDSCH may be used. With a SPS PDSCH, a logical 5G radio node, such as a gNB, configures a UE with one or more SPS configurations via radio resource control (RRC) messages. A SPS configuration IE per serving cell per BWP includes periodicity, PUCCH resource information and other information required for SPS operation, as shown below, [Rel-15 TS 38.331 Clause 6].

```
-- ASN1START
-- TAG-SPS-CONFIG-START
SPS-Config ::=            SEQUENCE {
    periodicity           ENUMERATED {ms10, ms20, ms32, ms40, ms64, ms80, ms128,
ms160, ms320, ms640,
                            spare6, spare5, spare4, spare3, spare2, spare1},
    nrofHARQ-Processes      INTEGER (1..8),
    n1PUCCH-AN              PUCCH-ResourceId
OPTIONAL, -- Need M
    mcs-Table             ENUMERATED {qam64LowSE}
OPTIONAL, -- Need S
    ...
}
```

Figure 6:
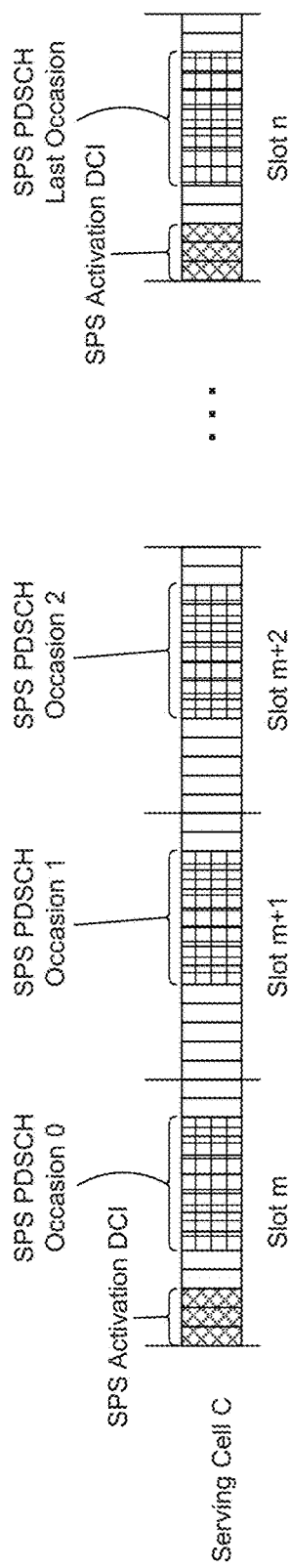
FIG. 6 depict an example of a SPS PDSCH operation in Rel-15 having a periodicity of one slot.

A SPS configuration is activated by an activation DCI that, in general, can be any of the DCI formats that schedule a DG-PDSCH with some additional validation mechanism performed [TS 38.213 Clause 10.2]. Compared to a DCI scheduling a DG-PDSCH, an SPS activation DCI is scrambled by a configured grant radio network temporary identifier (CS-RNTI) and some specific DCI fields are specially used for identification of an SPS activation, including a new data indicator (NDI), a hybrid automatic repeat request (HARQ) process number (HPN) and a redundancy version (RV). A SPS activation DCI schedules the first SPS PDSCH occasion just like a DG-PDSCH. Subsequent SPS occasions are determined according to the periodicity IE in the SPS configuration and the time and frequency domain resource indicated by the activation DCI. An example of a SPS PDSCH operation in Rel-15 is depicted in FIG. 6 in which a periodicity of one slot is assumed. Note than in the above IE, the minimum periodicity is 10 ms (10 slots for subcarrier spacing of 15 kHz). The periodicity in FIG. 6 is only chosen for the sake of elaboration.

In FIG. 6, a SPS activation DCI is received from serving cell C in slot m and indicates/schedules the first SPS PDSCH occasion 0 in slot m. The next SPS PDSCH occasions are determined based on the periodicity of 1 slot. Within the SPS slots, the time-frequency resources will follow that of the first SPS occasion in slot m. The active SPS configuration is released by the release DCI in slot n. Although the release DCI technically does not schedule a resource, it is assumed that the release DCI is associated with one last PDSCH occasion. The last PDSCH occasion is only used for semi-static HARQ-ACK codebook construction. A UE assumes that there will be no SPS PDSCH reception in this last occasion.

Figure 7:
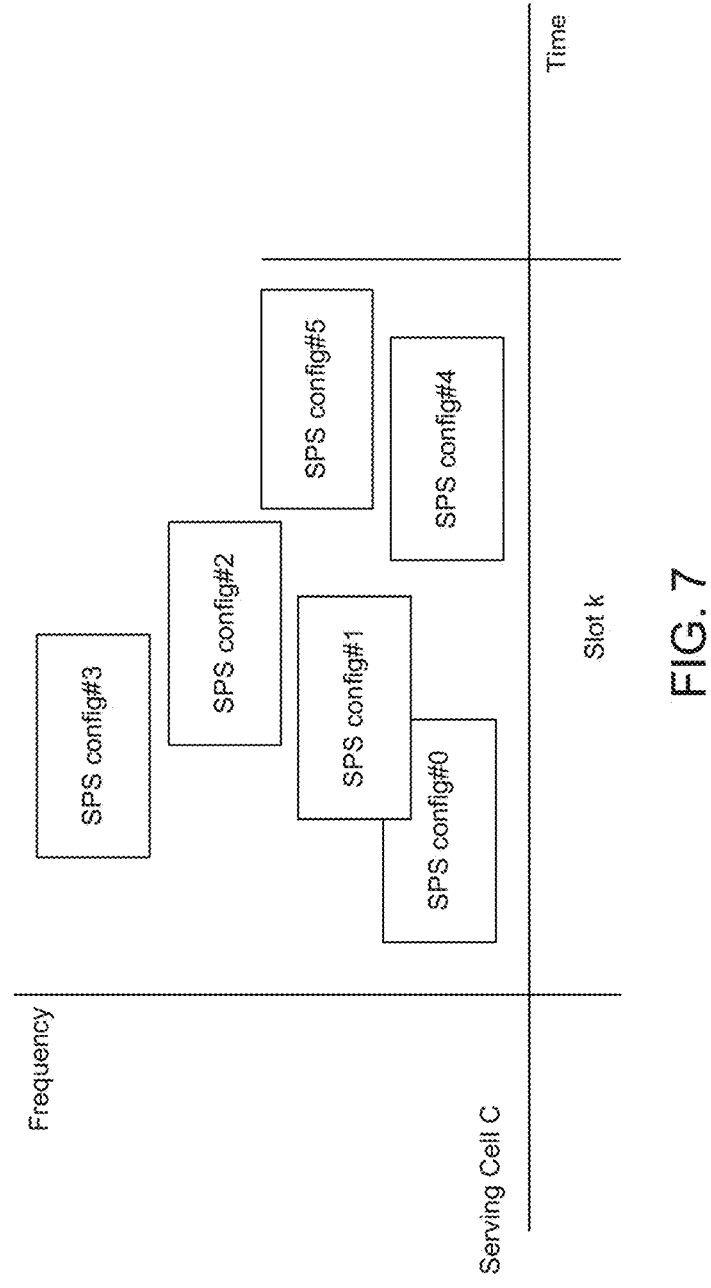
FIG. 7 depicts set of overlapping SPS occasions and the corresponding type-1 HARQ-ACK codebook sub-groups.

To address the different requirements for different ultra-reliable low-latency communication (uRLLC) service types, Rel-16 supports SPS periodicities down to 1 slot for different subcarrier spacing (SCS). SPS ACK/NACK dropping for TDD Cell in Rel-15, there are a limited number of active SPS configuration per BWP of a serving cell. To provide more flexibility for a gNB to schedule uRLLC and satisfy the latency requirements, it has been agreed to allow multiple active SPS configurations per serving cell per BWP in Rel-16. By allowing multiple active SPS configurations per BWP of serving cell, multiple active SPS occasions may overlap in time/frequency in one slot, as depicted in FIG. 7. More specifically, FIG. 7 depicts set of overlapping SPS occasions and the corresponding type-1 HARQ-ACK codebook sub-groups. In Rel-16, a procedure has been defined for a UE to determine the SPS PDSCHs per slot that the UE is expected to receive among the overlapping occasions. Consider, for example, that a UE is expected to receive SPS PDSCH with configuration #0 and #4 in FIG. 7.

HARQ Process Aspects of SPS PDSCHs

One important scenario for a uRLLC service type in NR is deployment in a time-division duplex (TDD) cell. Unlike frequency-division duplex (FDD), in a TDD cell not all slots/symbols are available for uplink transmission. A different control mechanism may be used by a gNB to specify a TDD pattern. In particular, semi-static TDD configuration via radio resource control (RRC) determines the set of UL/DL and Flexible symbols either as cell-specific system information or a UE specific RRC configuration. The gNB may further determine a TDD pattern via dynamic slot format indicator (SFI) DCI format.

Unlike DG PDSCH in which ACK/NACK (A/N) timing is typically indicated dynamically and in which a gNB may avoid collision of A/N PUCCH with TDD DL symbols, A/N timing of the SPS PDSCH may be semi-statically configured via the network. With introduction of multiple SPS configurations per BWP and different periodicities of the SPS configurations, it may be practically unavoidable that some SPS A/N may be transmitted on some invalid symbols according to TDD configuration. System performance degradation due to dropping of SPS A/N PUCCH may be significant. Therefore, some an enhancement is under discussion in Rel-17 industrial internet of things (IIoT) and uRLLC (IIoT/uRLLC) work item. As parts of the enhancement, a SPS A/N PUCCH that a UE would drop under Rel-16/16 may be postponed to a "first available" PUCCH resource.

Multi-TRP Transmission and Reception

Multiple input multiple output (MIMO) transmission schemes have been widely used in digital communication to increase capacity of a wireless channel. The 3GPP mobile communication standard supports MIMO transmission schemes in which a physical downlink shared channel (PDSCH) or physical uplink shared channel (PUSCH) among other types of channels and signals may be transmitted from different physical antenna or different antenna ports.

Different antenna ports of a MIMO transmission scheme may be from a single transmission and reception point (TRP) in which case the scheme is referred to as single TRP transmission scheme. Different antenna ports of one or different channels may also be within multiple TRPs that are typically non-co-located in which case the scheme is referred to as Multi-TRP (M-TRP) scheme. An example of such M-TRP scenario may be when a rank-2 PDSCH is transmitted by two antenna ports in which the first port is within a TRP1 and the second port is within a TRP2.

Figure 8:
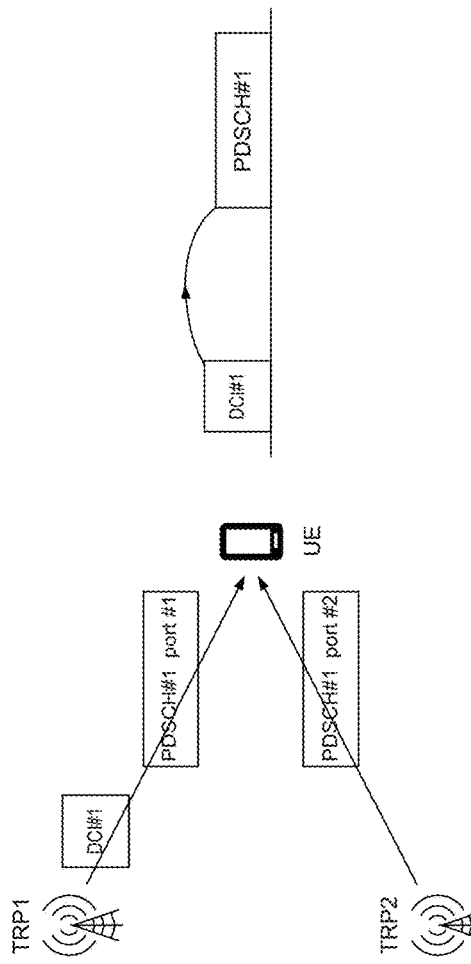
FIG. 8 shows an example of single-DCI M-TRP transmission.

M-TRP transmissions may be categorized into single-DCI and multi-DCI M-TRP. With a single-DCI M-TRP, a single PDCCH is transmitted from one of the TRPs and schedules one or multiple PDSCHs. In one transmission scheme, different layers of a single PDSCH are transmitted from different TRPs. In other transmission schemes, multiple PDSCHs (multiplexed in time or frequency domain) with the same transport block (TB) are transmitted in which all the layers of a PDSCH are transmitted from one of the TRPs. Different PDSCHs among the multiple PDSCHs may be transmitted from different TRPs according to a pattern. With multi-DCI M-TRP, each TRP transmits its own PDCCH that schedules a PDSCH that is also transmitted from the ports within the same TRP. FIG. 8 shows an example of single-DCI M-TRP transmission. A single DCI #1 (PDCCH) is transmitted from TRP1 to a UE and schedules a PDSCH #1 with two layers. A layer #1 is transmitted from an antenna port #1 within TRP1 while a layer #2 is transmitted from an antenna port #2 within TRP2.

Figure 9:
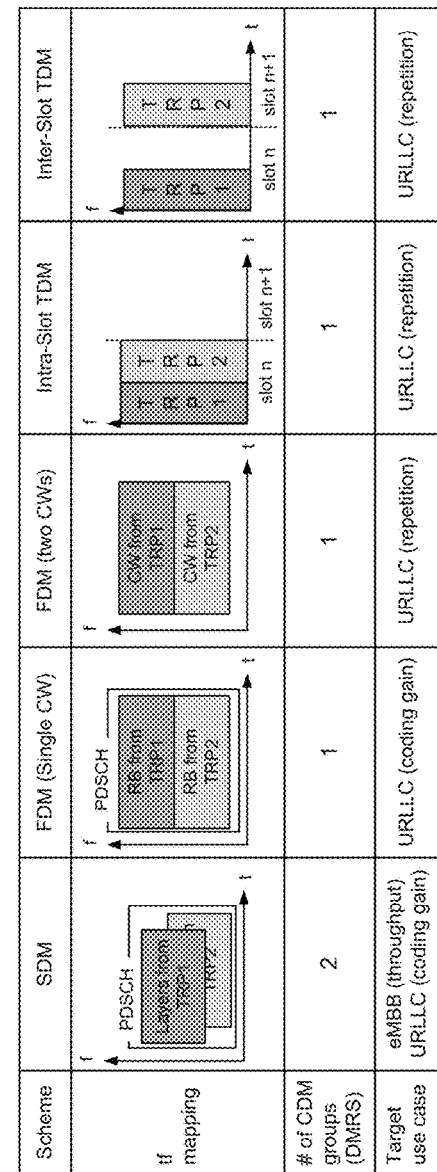
FIG. 9 shows different supported S-DCI transmission schemes in Rel-16.

There are different S-DCI transmission schemes in which a scheduled PDSCH is associated with two different TCI states. FIG. 9 shows the different supported S-DCI transmission schemes in Rel-16.

Figure 10:
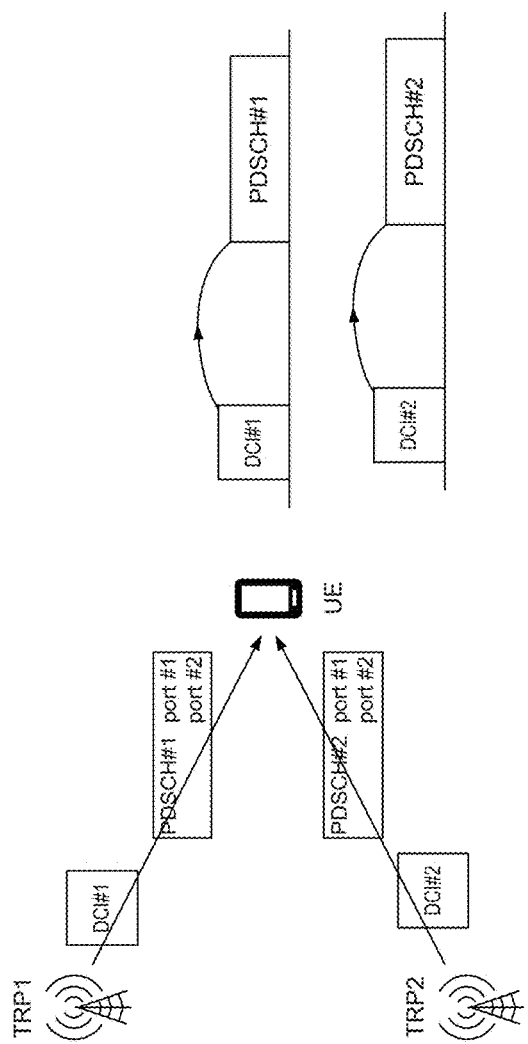
FIG. 10 depicts an example of multi-DCI M-TRP transmission.

FIG. 10 depicts an example of multi-DCI M-TRP transmission. Each of TRP1 and TRP2 transmits their own DCIs to a UE. Each DCI schedules one PDSCH with two-layer transmission. That is, DCI #1 schedules PDSCH #1 and DCI #2 schedules PDSCH #2. All of the layers of a given PDSCH are transmitted from the antenna ports within the same TRP.

Single-DCI M-TRP PDSCH Schemes

In Rel-16, multiple PDSCH transmission schemes have been agreed upon to be supported. With one enhancement, a single PDCCH schedules one or multiple PDSCH occasions in which the one or multiple occasions may be associated with two different TCI states, one from each transmitting TRP.

The supported schemes indicated in FIG. 9 may be spatial division multiplexing (SDM), frequency division multiplexing (FDM) with single codeword and two codewords, intra-slot time-division multiplexing (TDM) repetition and inter-slot TDM. The different schemes are suitable for addressing target use cases, as indicated in FIG. 9.

Multiple Active SPS Configurations for uRLLC Use Case

Multiple active SPS configurations per serving cell per bandwidth part (BWP) may support different use cases of uRLLC applications. When a UE has multiple active SPS configurations per cell, the UE may receive multiple SPS PDSCHs that overlap in time. In this case, for a UE that may not be capable of processing multiple overlapping PDSCHs, specific SPS PDSCHs may be chosen to be decoded by UE. The choice may be based on a lowest configuration index. An example in which a UE may be configured with multiple SPS configurations is shown in FIG. 7. If a solution based on a lowest configuration index is selected, the UE may only decode a SPS PDSCH having configuration #0 and a SPS PDSCH having configuration #4 among the six PDSCHs depicted in the slot.

With Multi-DCI Multi-TRP, every DG PDSCH or SPS PDSCH may be associated with one of the TRPs according to the scheduling/activation PDCCH via a higher-layer parameter in the CORESET configuration. Every CORESET configuration contains an RRC parameter CORSETPoolIndex that takes a value of 0 or 1. If the scheduling PDCCH is in a search space associated with a CORESET with CORSETPoolIndex=0/1, it is assumed that the first/second TRP has transmitted the DG PDSCH. Similarly, if the activation PDCCH of a SPS PDSCH is in a search space associated with a CORESET with CORSETPoolIndex=0/1, it is assumed that the first/second TRP has transmitted the SPS PDSCH.

With Multi-TRP operation, the UE may declare the capability to process two overlapping PDSCHs (DG or SPS).

Problem #1—SPS A/N Multiplexed Appended to DG A/N

As previously mentioned, a specific enhancement for SPS A/N dropping may be when a PUCCH carries SPS A/N overlaps with invalid TDD symbols. According to the enhancement, a UE will drop the PUCCH transmission and postpone the PUCCH transmission to a first available PUCCH resource. A similar enhancement may be introduced for a PUCCH carrying both SPS and DG A/N bits. Although with a DG A/N bit a gNB has the opportunity to indicate a PUCCH resource that does not overlap with invalid symbols, network flexibility may be reduced. For example, a maximum configured value of $K_1$ in dl-DataToUL-ACK may not be sufficiently large to indicate a valid UL slot for PUCCH transmission. In this case, a gNB may still schedule a DG PDSCH and indicate an invalid UL slot for PUCCH transmission. A UE then postpones the indicated PUCCH to a first available PUCCH slot. In the methods that follow, a first available PUCCH resource may be defined in different ways, such as a first PUCCH resource in a slot with at least the same number of UL symbols as the dropped PUCCH, or as a PUCCH resource in a slot with all UL symbols, and so on. Further, the existence of UL transmissions overlapping in time and/or frequency with the postponed PUCCH resource may also affect the definition of the first available PUCCH resource. For example, a PUCCH resource may not be considered as available if there is an UL transmission overlapping in time and/or frequency in the intended resource. Alternatively, such overlapping resource may still be considered as available by dropping existing UL transmissions depending on the type of the UL transmission. If, for example, the UL transmission is for PUCCH only carrying CSI reporting or PUSCH without UL-SCH, then such existing UL transmission may be dropped. Alternatively, such overlapping resource may still be considered as available, and the existing multiplexing rule of UCI, prioritization rule between different PHY priorities can be applied.

Method 1-1—A/N PUCCH Dropped Due to TDD Collision: All DG A/N Bits

When operating in a TDD PUCCH cell, if a PUCCH resource dynamically indicated by gNB via a PUCCH resource field and PDSCH-to-HARQ-ACK time field in the DCI overlaps with TDD invalid symbols, and an A/N payload only includes dynamic grant A/N bits, then a UE drops the PUCCH transmission and postpones the transmission to a first available PUCCH resource. TDD invalid symbols may include DL symbols and/or flexible symbols configured semi-statically or dynamically.

Method 1-1 may be considered as being overdesigned. A more practical scheme may provide that a UE may only drop the dynamically indicated PUCCH if the PUCCH includes SPS A/N bits in addition to the DG bits.

Method 1-2—A/N Dropped Due to TDD Collision: DG+SPS A/N Bits

When operating in a TDD PUCCH cell, if a PUCCH resource dynamically indicated by gNB via a PUCCH resource field and PDSCH-to-HARQ-ACK time field in the DCI overlaps with TDD invalid symbols, and an A/N payload only includes both dynamic grant and SPS A/N bits, then a UE drops the PUCCH transmission and postpones the transmission to a first available PUCCH resource. TDD invalid symbols may include DL symbols and/or flexible symbols configured semi-statically or dynamically.

Problem #2—SPS A/N Dropping for TDD Cell with PUCCH Slot/Span-Based Repetitions

With a basic PUCCH dropping enhancement, a PUCCH retransmission may be triggered implicitly when the PUCCH overlaps with invalid TDD symbols, i.e., when the PUCCH is dropped. One aspect that may be considered is whether the PUCCH is considered as dropped if it is an occasion among PUCCH repetitions. This may be especially important if the PUCCH has been configured with rather large number of repetitions $N_{rep}$ and a few number of the occasions are dropped. In this case, a postponed retransmission may not be necessary for the following reasons: The reliability of PUCCH transmission is not impacted significantly due to small number of dropped occasions. A retransmission with $N_{rep}$ repetitions may have negative impact on the latency requirement for uRLLC as a gNB cannot schedule another PDSCH for the same HARQ process ID (HPID) until after the end of the transmission of the current PUCCH as given in TS 38.214, as copied below. With retransmission, the end of the current PUCCH is delayed to a later time. The UE is not expected to receive another PDSCH for a given HARQ process until after the end of the expected transmission of HARQ-ACK for that HARQ process.

Figure 11:
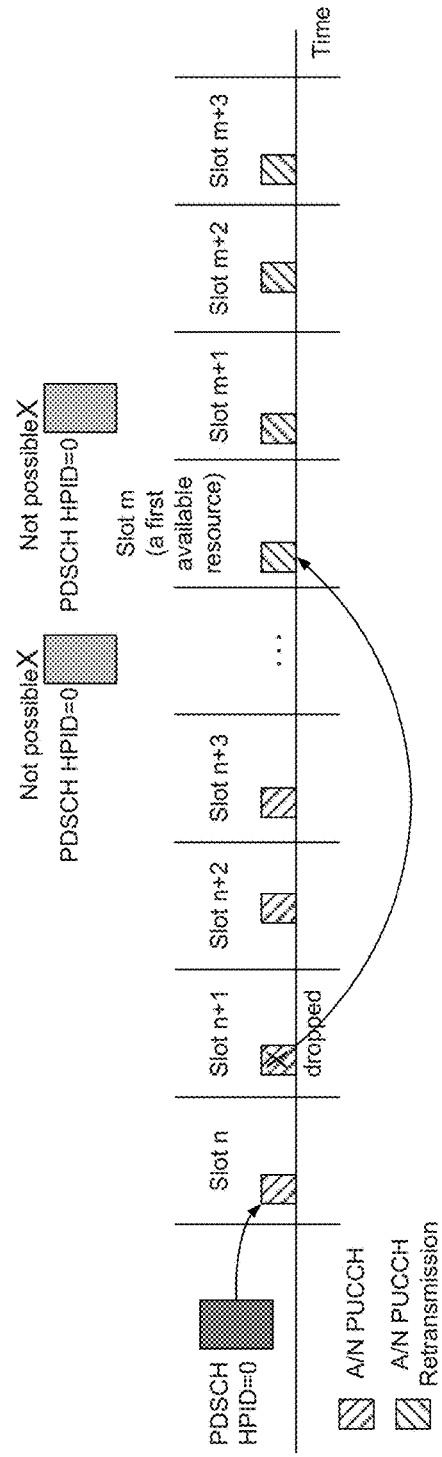
FIG. 11 depicts a negative impact on scheduling latency due to partial dropping of a PUCCH configured with slot-based repetition.

FIG. 11 depicts a negative impact on scheduling latency due to partial dropping of a PUCCH configured with slot-based repetition. More specifically, FIG. 11 depicts an example in which a PUCCH in a slot n+1 is dropped and the next available resource happens to be in a slot m>n+3. In this case, another PDSCH with the same HPID cannot be scheduled before the end of PUCCH in slot m+3, which has a negative impact on the uRLLC latency. The following Methods 2-1 through 2-5 address this issue.

Method 2-1—A/N PUCCH Dropped+PUCCH Repetitions: All Repetitions Must be Dropped

When operating in a TDD PUCCH cell, if a PUCCH transmission is configured with $N_{rep}$ slot/span-based repetitions, then a UE retransmits the dropped PUCCH in a first available PUCCH resource if all of the $N_{rep}$ repetitions are dropped.

PUCCH resources for $N_{rep}$ retransmissions may be determined based on the "available" resource definition described in Problem #2. That is, a gNB may not schedule another PDSCH for the same HPID until after the end of the transmission of the current PUCCH, as given in TS 38.214. This behavior may be equivalent to extending postponement behavior to retransmissions. For example, some of the retransmissions may also be dropped. In this case, the dropped retransmissions may be further postponed following the same behavior. This scheme, however, may create a prolonged adverse impact to a system. Alternatively, postponement of PUCCH may only be applied once, and any additionally dropped retransmissions may not be retransmitted. This situation may also be avoided if determination of first available PUCCH resource considers all repetitions. In other words, with PUCCH $N_{rep}$ repetitions, a PUCCH resource may be considered to be available if $N_{rep}$ consecutive resources are available.

Method 2-2—A/N PUCCH Dropped+PUCCH Repetitions: At Least One Repetition Must be Dropped When operating in a TDD PUCCH cell, if a PUCCH transmission is configured with $N_{rep}$ slot/span-based repetitions, then a UE retransmits a dropped PUCCH in a first available PUCCH resource if any of the $N_{rep}$ repetitions are dropped.

PUCCH resources for $N_{rep}$ retransmissions may be determined based on the "available" resource definition described in Problem #2, which again may be equivalent to extending postponement behavior to retransmissions. Some of the retransmissions may, for example, also be dropped. In this case, the dropped retransmissions may further be postponed following the same behavior. This scheme, however, may create a prolonged adverse impact to a system. Alternatively, postponement of a PUCCH may only be applied once, and further dropping may not be retransmitted. This situation may also be avoided if determination of first available PUCCH resource considers all repetitions. In other words, with PUCCH $N_{rep}$ repetitions, PUCCH resource may be considered to be available if $N_{rep}$ consecutive resources are available.

Figure 12:
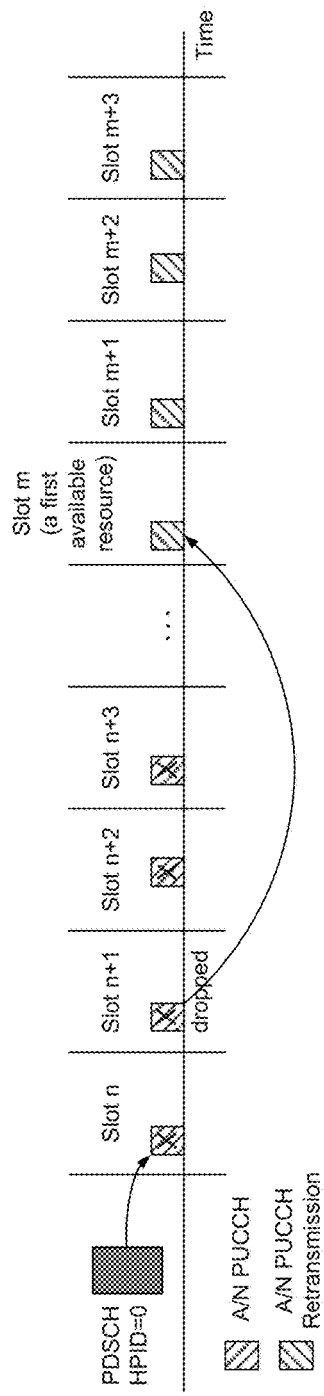
FIG. 12 depicts an example of a UE retransmitting a PUCCH in slot m according to the subject matter disclosed herein.

As an example, in FIG. 12 a UE retransmits the PUCCH in slot m. Referring back to FIG. 11, a UE does NOT retransmit PUCCH in slot m, whereas in FIG. 12 a UE retransmits the PUCCH in slot m. Thus, Method 2-1 may prioritize latency over reliability, whereas Method 2-2 may prioritize reliability over latency.

To ensure both reliability and latency when performing retransmission, a threshold may be considered so that when the number of dropped PUCCHs are below the threshold, a UE performs retransmission. This scheme is provided by Method 2-3.

Method 2-3—A/N PUCCH Dropped+PUCCH Repetitions: At Least M Repetition Must be Dropped When operating in a TDD PUCCH cell, if a PUCCH transmission is configured with $N_{rep}$ slot/span-based repetitions, then a UE retransmits the dropped PUCCH in a first available PUCCH resource if at least M repetitions among the $N_{rep}$ repetitions have been dropped. Any of the following options may be applied to determine M.

M may be RRC configured;
M may be RRC configured based on a value or multiple values UE reports as a capability;

$$M = \left\lfloor \frac{N_{rep}}{4} \right\rfloor;$$

$$M = \left\lfloor \frac{N_{rep}}{2} \right\rfloor;$$

$$\text{and } M = \left\lfloor \frac{3N_{rep}}{4} \right\rfloor.$$

PUCCH resources for $N_{rep}$ retransmissions may be determined based on the "available resource" definition in Problem #2, which may be equivalent to extending postponement behavior to retransmissions. For example, some of the retransmissions may also be dropped. In this case, the dropped retransmissions may be further postponed following the same behavior. Again, this scheme may create a prolonged adverse impact to a system. Alternatively, postponement of a PUCCH may only be applied once, and further dropping may not be retransmitted. This situation may also be avoided if determination of first available PUCCH resource considers all repetitions. In other words, with PUCCH $N_{rep}$ repetitions, a PUCCH resource may be considered to be available if $N_{rep}$ consecutive resources are available.

Figure 13:
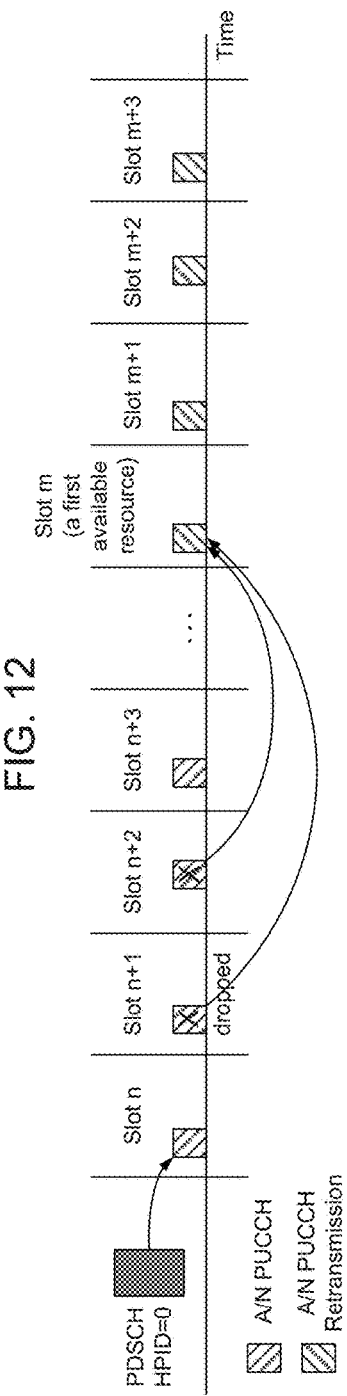
FIG. 13 depicts an example of a UE retransmitting a PUCCH in slot m with M=2 according to the subject matter disclosed herein.

Referring to FIG. 13, as an example and assuming M=2, a UE retransmits the PUCCH in slot m.

So far, only methods in which all $N_{rep}$ repetitions are retransmitted have been considered. Such a scheme may be wasteful if only a few of $N_{rep}$ repetitions have been dropped. Hence, an alternative may be to retransmit only dropped repetitions.

Method 2-4—A/N PUCCH Dropped+PUCCH Repetitions: Only Dropped Repetition is Retransmitted When operating in a TDD PUCCH cell, if a PUCCH transmission is configured with $N_{rep}$ slot/span-based repetitions, and if M repetitions among the $N_{rep}$ repetitions are dropped, then a UE retransmits M PUCCH repetitions.

PUCCH resources for M retransmissions may be determined based on the "available" resource definition described in Problem #2, which may also be equivalent to extending postponement behavior to retransmissions. For example, some of the M repetitions may be dropped. In this case, the dropped repetitions may further be postponed following the same behavior. This scheme may again create prolonged adverse impact to a system. Alternatively, postponement of a PUCCH may only be applied once, and further dropping may not be retransmitted. This situation may also be avoided if determination of first available PUCCH resource considers all repetitions. In other words, PUCCH resource may be considered to be available if M consecutive resources are available.

Figure 14:
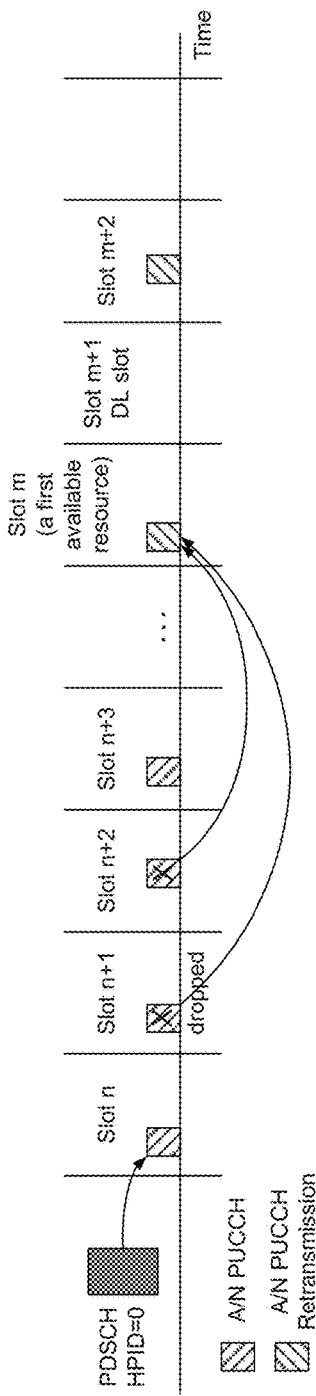
FIG. 14 depicts an example of UE behavior with Method 2-4 in which $N_{rep}=4$, $N_{dropped}=2$ according to the subject matter disclosed herein.

FIG. 14 depicts an example of UE behavior with Method 2-4 in which $N_{rep}$=4, $N_{dropped}$=2. The UE retransmits the dropped PUCCHs in slot n+1 and n+2 in slot m and slot m+2. Note that slot m+1 is a DL slot and may not be used for PUCCH retransmission.

Once a PUCCH occasion among the repetitions has been dropped, it should be considered whether the UE retransmits the dropped occasion before the end of the last occasion of the PUCCH repetition. This may be useful to reduce the latency of the A/N transmission if multiple occasions are dropped and there are available PUCCH resources before the end of the last occasion. For example, assume that the PUCCH may be configured with $N_{rep}$=4 repetitions in slots 1 to 4 and occasions in slot 1 and 3 are dropped due to collision with invalid TDD symbols. If there is an available PUCCH resource in slot 3, the retransmission of the dropped PUCCH in slot 1 may be performed in slot 3 on the valid symbols, instead of postponing the first retransmission until after the end of the last occasion. The Method 2-5 covers this scheme.

Method 2-5—A/N PUCCH Dropped+PUCCH Repetitions: PUCCH Retransmission Before the Last Occasion is Supported When operating in a TDD PUCCH cell, if a PUCCH transmission is configured with $N_{rep}$ slot/span-based repetitions in slots/sub-slot i, i+1, . . . , i+$N_{rep}$−1, and a UE retransmits a dropped PUCCH in slot/sub-slot i≤j≤$N_{rep}$−1 in a first available PUCCH resource in slot/sub-slot k≥j, then retransmission slot k may be before the end of the repetition period. That is, k≤$N_{rep}$−1 is supported.

Problem #3—SPS A/N Dropping for TDD Cell with PUCCH Slot/Span-Based Repetitions+Frequency Hopping A PUCCH format may be configured with frequency hopping as shown in TS 38.331 below.

| | | |
|---|---|---|
| PUCCH-Config ::= | SEQUENCE { | |
| ... | | |
| format1 SetupRelease { PUCCH-FormatConfig } | Optional, - - Need M | |
| format2 SetupRelease { PUCCH-FormatConfig } | Optional, - - Need M | |
| format3 SetupRelease { PUCCH-FormatConfig } | Optional, - - Need M | |
| format4 SetupRelease { PUCCH-FormatConfig } | Optional, - - Need M | |
| PUCCH-FormatConfig :: = | SEQUENCE { | |
| interslotFrequencyHopping | ENUMERATED {enabled} | OPTIONAL, - - Need R |
| additionalDMRS | ENUMERATED {true} | OPTIONAL, - - Need R |
| maxCodeRate | PUCCH-MaxCodeRate | OPTIONAL, - - Need R |
| nrofSlots | ENUMERATED {n2, n4, n8} | OPTIONAL, - - Need S |
| pi2BPSK | ENUMERATED {enabled} | OPTIONAL, - - Need R |
| simultaneousHARQ-ACK-CSI | ENUMERATED {true} | OPTIONAL, - - Need R |

When a PUCCH format is configured having interslotFrequencyHopping enabled, and slot/sub-slot-based repetitions, a set of dropped PUCCH occasions may be such that the frequency diversity is not achieved after dropping. For example, consider that a number of repetitions are 4 and PUCCH occasions in the first and third slot are on the same set of subcarriers while the occasions on the second and the fourth is on a different set of subcarrier. Suppose that the first and third occasions are dropped, then the frequency diversity may not be achieved. As an enhancement, a UE may only perform the frequency hopping among the occasions that are not dropped. Method 3-1 describes such a scheme.

Method 3-1—A/N PUCCH Dropped+PUCCH Repetitions+Frequency Hopping

When operating in a TDD PUCCH cell, if a PUCCH transmission is configured with slot/span-based repetitions, and if a UE transmits $N_{total}$ PUCCH(s) including the occasions that are not dropped and some retransmissions of the dropped occasions, then the UE performs the frequency hopping among the $N_{total}$ PUCCHs in which the $N_{total}$ PUCCH(s) are ordered in ascending order of their slots.

Figure 15:
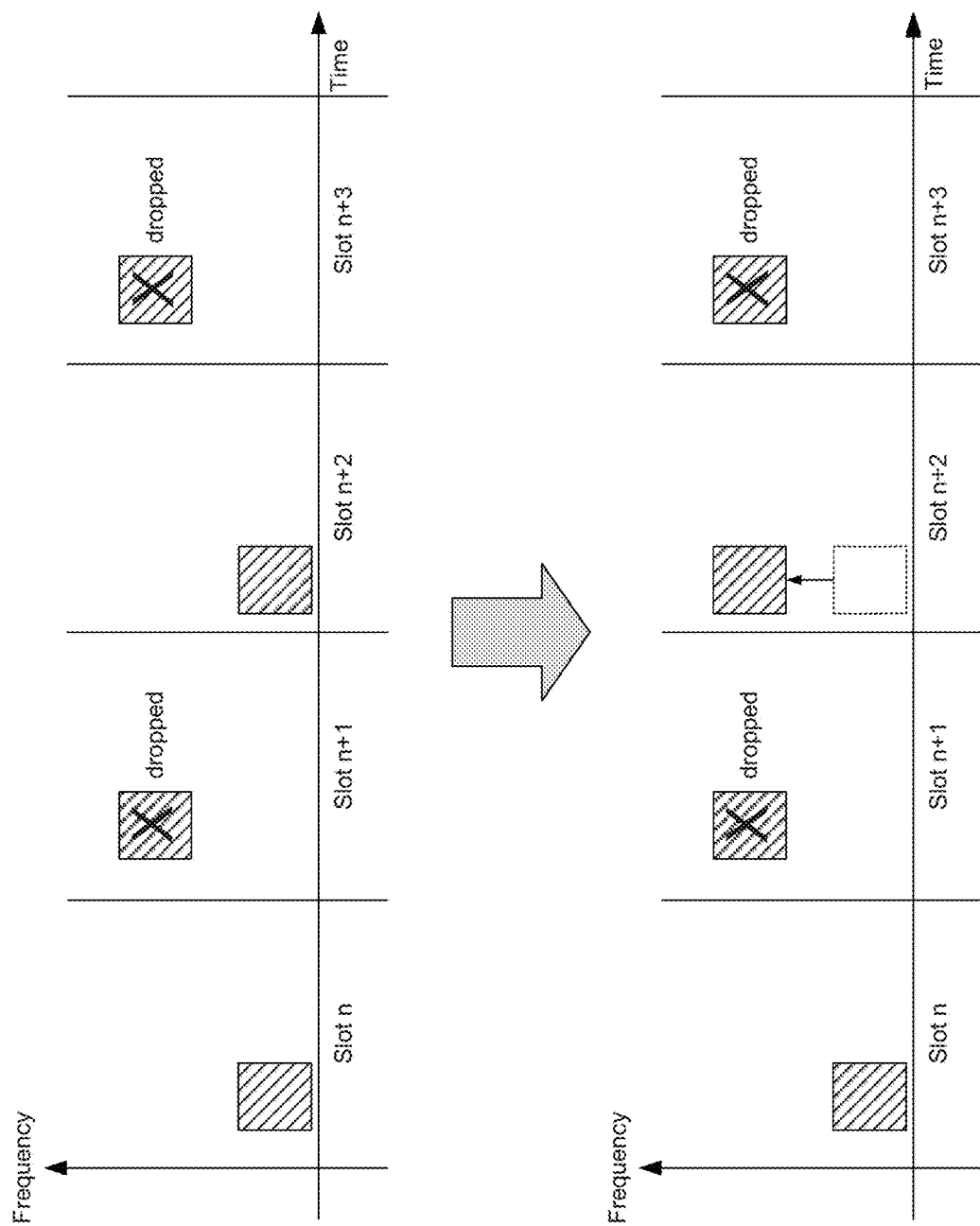
FIG. 15 depicts an example in which two occasions are dropped and a UE transmits $N_{total}=2$ PUCCHs in total according to the subject matter disclosed herein.

An example for Method 3-1 is depicted in FIG. 15 in which two occasions are dropped and a UE transmits $N_{total}$=2 PUCCHs in total. The original frequency-hopping pattern depicted at the top of FIG. 15 may be changed only applied to occasions in slot n and n+2 as depicted at the bottom of FIG. 15.

Method 3-2—A/N PUCCH Dropped+PUCCH Repetitions+Frequency Hopping

When operating in a TDD PUCCH cell, if a PUCCH transmission is configured with slot/span-based repetitions, and if a UE transmits $N_{total}$=$N_1$+$N_2$ PUCCH(s) including $N_1$ occasions that are not dropped and $N_2$ retransmissions of the dropped occasions, then the UE performs the frequency hopping among $N_1$ PUCCHs and $N_2$ PUCCHs separately while resetting the hopping pattern after $N_1$ PUCCHs in which the $N_1$ PUCCHs and $N_2$ PUCCHs are respectively ordered in ascending order of their slots.

As an alternative, the UE keeps the original frequency hopping among $N_1$ PUCCHs and performs separate frequency hopping among $N_2$ PUCCHs while resetting the hopping pattern after $N_1$ PUCCHs in which $N_2$ PUCCHs are ordered in ascending order of their slots.

Problem #4—SPS A/N Dropping for TDD Cell with PUCCH Slot/Span-Based Repetitions+Multi-TRP Beam Alternating PUCCH Transmission With multiple TRP operation, a UE transmits and receives uplink and downlink channels to the multiple TRPs. An uplink transmission may ensure that the uplink channel is transmitted with different beams (SpatialRelationInfo) to achieve beam diversity and in turn mitigate the beam blockage issue. In an enhanced M-TRP PUCCH transmission with $N_{rep}$ slot/sub-slot-based repetition, a UE applies an alternating uplink beam for PUCCH transmission. For example, assuming $N_{rep}$=4, a UE applies an uplink beam 1 for PUCCHs in the first and third slot and uplink beam 2 for the PUCCHs in the second and fourth slots.

Similar to the issue raised in Problem #3, the dropped PUCCHs may be such that the beam diversity may not be achieved. For example, consider that the number of repetitions are 4, and PUCCH occasions in the first and third slot are transmitted with UL beam 1 while the occasions on the second and the fourth are transmitted with UL beam 2. Suppose that the first and third occasions are dropped, then the beam diversity may not be achieved. As an enhancement, a UE may only perform an alternating beam among the occasions that are not dropped.

Method 4-1—A/N PUCCH Dropped+PUCCH Repetitions+M-TRP Alternating UL Beams

When operating in a TDD PUCCH cell, if a PUCCH transmission is configured with multi-TRP slot/span-based repetitions with alternating UL beams in consecutive slot/sub-slots, and if a UE transmits $N_{total}$ PUCCH(s) including the occasions that are not dropped and some retransmissions of the dropped occasions, then the UE performs an alternating UL beam among the $N_{total}$ PUCCHs in which the $N_{total}$ PUCCH(s) are ordered in ascending order of their slots.

Figure 16:
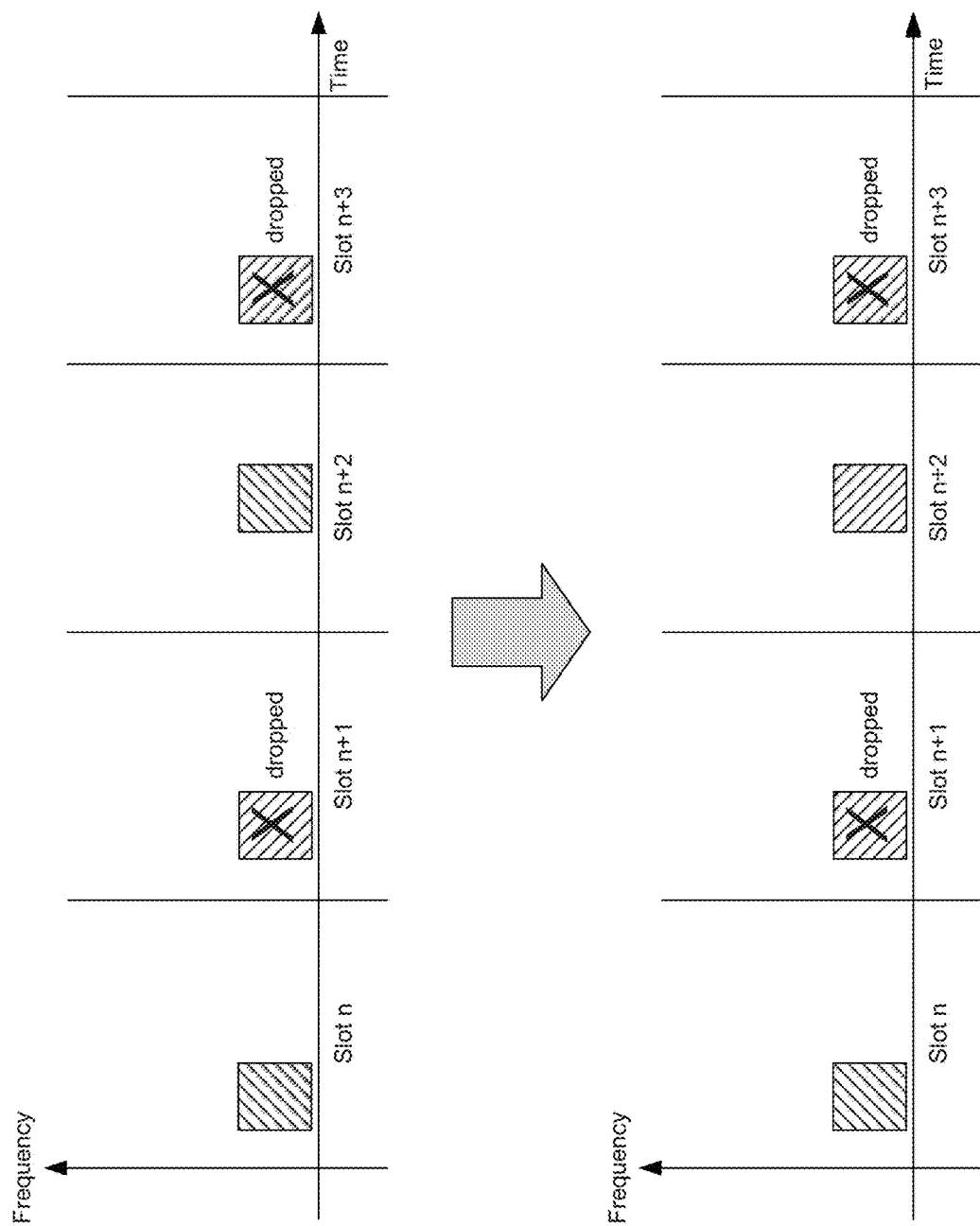
FIG. 16 depicts an example of a PUCCH being configured with $N_{rep}=4$ repetitions and a UE would transmit PUCCHs in slot n and n+2 with UL beam 1 and the PUCCHs in slots n+1 and n+3 with UL beam 2 according to the subject matter disclosed herein.

FIG. 16 depicts an example of a PUCCH being configured with $N_{rep}$=4 repetitions and a UE would transmit PUCCHs in slot n and n+2 with UL beam 1 and the PUCCHs in slots n+1 and n+3 with UL beam 2. As the PUCCHs in slot n+1 and n+3 are dropped, as depicted at the top of FIG. 16, the UE performs an alternating UL beam to PUCCHs in slot n and n+2 to achieve beam diversity at the bottom of FIG. 16.

Method 4-2—A/N PUCCH Dropped+PUCCH Repetitions+M-TRP Alternating UL Beams

When operating in a TDD PUCCH cell, if a PUCCH transmission is configured with multi-TRP slot/span-based repetitions with alternating UL beams in consecutive slot/sub-slots, and if a UE transmits $N_{total}$=$N_1$+$N_2$ PUCCH(s) including $N_1$ occasions that are not dropped and $N_2$ retransmissions of the dropped occasions, then the UE may perform an alternating UL beam among $N_1$ PUCCHs and $N_2$ PUCCHs separately while resetting the beam alternating pattern after $N_1$ PUCCHs in which the $N_1$ PUCCHs and $N_2$ PUCCHs are respectively ordered in ascending order of their slots.

As an alternative, a UE keeps the original beam alternating pattern among $N_1$ PUCCHs and performs separate alternating beams among $N_2$ PUCCHs while resetting the beam alternating pattern after $N_1$ PUCCHs in which $N_2$ PUCCHs are ordered in ascending order of their slots.

Problem #5—SPS A/N dropping for TDD cell with PUCCH slot/span-based repetitions+retransmission resources In Rel-15 for a TDD cell and when the PUCCH is configured with repetitions, a UE automatically defers the retransmission of a dropped PUCCH due to it overlapping with invalid (e.g., DL symbols). The following Spec from TS 38.213 specifies the UE behavior: "For unpaired spectrum, the UE determines the $N_{PUCCH}^{repeat}$ slots for a PUCCH transmission starting from a slot indicated to the UE as described in Clause 9.2.3 and having—an UL symbol, as described in Clause 11.1, or flexible symbol that is not SS/PBCH block symbol provided by startingSymbolIndex in PUCCH-format1, or in PUCCH-format3, or in PUCCH-format4 as a first symbol, and consecutive UL symbols, as described in Clause 11.1, or flexible symbols that are not SS/PBCH block symbols, starting from the first symbol, equal to or larger than a number of symbols provided by nrofsymbols in PUCCH-format1, or in PUCCH-format3, or in PUCCH-format4."

As may be seen, a dropped repetition may be deferred to a slot which has a "valid" symbol indicated by the startingSymbolIndex RRC parameter in which a valid symbol is a UL symbol or a flexible symbol that is not SSB symbol. The slot should also have at least N consecutive valid symbols starting from the symbol indicated by startingSymbolIndex in which N is the length of the PUCCH format in terms of the number of symbols. This way of determining the resources for the deferred PUCCH is referred to herein as the "Rel-15 rule."

The Rel-15 rule for determining the resources for the deferred PUCCH may not be efficient particularly when a TDD cell may be configured with a large number of DL symbols and the PUCCH format may be rather long. In this case, it is likely that the first slot with available resources may be relatively far away in time. This may have a negative impact on the latency requirement for uRLLC. As an alternative, an enhanced method for determining the resources for retransmission may be used. Examples include resources that may be determined by a fewer consecutive number of symbols than that of the original PUCCH format. If the available number of symbols is greater than a $N_{min}$, a UE would transmit the deferred PUCCH on them. Alternatively, resources may be determined by a number of non-consecutive symbols, and so on. This way of determining the resources for the deferred PUCCH is referred to herein as the "New Rule."

The following arrangement was made in RAN1 #103-e to transmit a dropped SPS A/N PUCCH. To address the issue of SPS HARQ-ACK dropping for TDD systems, the following two options may be focused on:

Option 1: Deferring HARQ-ACK until a next (e.g., first) available PUCCH

FFS: Details including the definition of a next (e.g., first) available PUCCH, CB construction/multiplexing.

Option 2: Dynamic triggering of a one-shot/Type-3 CB type of re-transmission

FFS: Details on triggering and/or CB construction (including potential Type-3 CB optimizations)/multiplexing.

In the case of a PUCCH configured with repetitions, it may not be clear how to apply the above arrangement. In particular, the rule for determining the resources for the transmission of the dropped repetitions ought to be specified. Moreover, whether to apply the agreement per each repetition or a certain number of repetition ought to be clarified. In the following, the UE behavior may be specified to address these questions.

Method 5-1—A/N PUCCH Dropped+PUCCH Repetitions: Deferral is Applied for First Repetition According to the New Rule When operating in a TDD PUCCH cell, if a PUCCH transmission is configured with $N_{rep}$ slot/span-based repetitions, then a UE only retransmits the first repetition, if dropped, according to the New Rule.

Method 5-2—A/N PUCCH Dropped+PUCCH Repetitions: Deferral is Applied for Last Repetition According to New Rule When operating in a TDD PUCCH cell, if a PUCCH transmission is configured with $N_{rep}$ slot/span-based repetitions, then a UE only retransmits the last repetition, if dropped, according to the New Rule.

Method 5-3—A/N PUCCH Dropped+PUCCH Repetitions: Deferral is Applied for the First Repetition According to Rel-15 Rule and Every Other Repetitions According to New Rule When operating in a TDD PUCCH cell, if a PUCCH transmission is configured with $N_{rep}$ slot/span-based repetitions, then a UE retransmits the first repetition, if dropped, according to the Rel-15 rule and every other repetition according to the New Rule.

Method 5-4—A/N PUCCH Dropped+PUCCH Repetitions: Deferral is Applied for Every Repetition According to New Rule When operating in a TDD PUCCH cell, if a PUCCH transmission is configured with $N_{rep}$ slot/span-based repetitions, then a UE retransmits every repetition, if dropped, according to the New Rule.

An alternative to Methods 5-1 through 5-3 may be that a certain number of dropped PUCCH repetitions may be retransmitted according to the Rel-15 rules and the remaining set of dropped repetitions may be transmitted according to the New Rule.

Method 5-5—A/N PUCCH Dropped+PUCCH Repetitions: Mixture of Deferral Types for the Repetitions When operating in a TDD PUCCH cell, if a PUCCH transmission is configured with $N_{rep}$ slot/span-based repetitions, if $N_{dropped}$ repetitions are dropped, then a UE retransmits $N_{rel-15}$ repetitions according to Rel-15 rule and $N_{new}=N_{dropped}-N_{rel-15}$ repetitions according to the New Rule.

$N_{rel-15}$ and/or $N_{new}$ may be configured to a UE via RRC or indicated via triggering/scheduling DCI as a function of the number of dropped repetitions $N_{dropped}$ and UE capability.

A gNB may indicate to a UE explicitly via DCI which dropped repetitions are to be retransmitted according to the Rel-15 rule and which ones are retransmitted according to the New Rule.

The first $N_{new}$ dropped repetitions may be retransmitted according the New Rule and the second $N_{rel-15}$ dropped repetitions may be retransmitted according the Rel-15 rule in which the dropped repetitions are sorted in ascending order of their start time.

Problem #6—SPS A/N Dropping for TDD Cell with PUCCH Slot/Span-Based Repetitions: Latency Aspects Another aspect of the PUCCH repetition is an induced latency. If a UE always retransmits all of the dropped PUCCH repetitions, it may increase the latency of uRLLC significantly, particularly when a set of available slots for retransmissions come too late. One solution to address this may be to limit the retransmission period to a certain time window. The maximum amount of delay may be described based on number of delayed slots.

Method 6-1—A/N PUCCH Dropped+PUCCH Repetitions

When operating in a TDD PUCCH cell, if a PUCCH transmission is configured with $N_{rep}$ slot/span-based repetitions, then a UE retransmits a repetition, if dropped, no later than $N_{delay}^{slot}$ slots after the slot in which UE would transmit the last repetition. $N_{delay}^{slot}$ may be determined based on a UE capability and RRC configuration and may be a function of the SCS of the PUCCH.

A UE does not transmit the PUCCH repetition after the introduced delay given by $N_{delay}^{slot}$. The maximum amount of delay may be alternatively described based on number of delayed symbols.

Method 6-2—A/N PUCCH Dropped+PUCCH Repetitions)

When operating in a TDD PUCCH cell, if a PUCCH transmission is configured with $N_{rep}$ slot/span-based repetitions, then a UE retransmits a repetition, if dropped, no later than $N_{delay}^{symbols}$ symbols after the end symbol of the last repetition the UE would transmit. $N_{delay}^{symbol}$ is determined based on UE capability and RRC configuration and can be a function of the SCS of the PUCCH. A UE does not transmit the PUCCH repetition after the introduced delay given by $N_{delay}^{symbol}$. The maximum amount of delay may be alternatively described based on absolute amount of time.

Method 6-3—A/N PUCCH Dropped+PUCCH Repetitions

When operating in a TDD PUCCH cell, if a PUCCH transmission is configured with $N_{rep}$ slot/span-based repetitions, then a UE retransmits a repetition, if dropped, no later than $T_{delay}$ seconds after the ending symbol of the last repetition UE would transmit. $T_{delay}$ may be determined based on UE capability and RRC configuration and may be a function of the SCS of the PUCCH. A UE does not transmit the PUCCH repetition after the introduced delay given by $T_{delay}$.

Problem #7—Out-of-Order HARQ-ACK Definition

In Rel-15/16, the A/N transmission for the PDSCHs is an in-order A/N reporting, except for specific multi-TRP transmission schemes. An in-order A/N reporting, as used herein, means that the A/N of the received PDSCHs may be transmitted to the gNB in the order that the PDSCHs have been received. TS 214 specifically defines an in-order A/N reporting as below.

---

From TS 38.214:
"In a given scheduled cell, the UE is not expected to receive a first PDSCH and a second PDSCH, starting later than the first PDSCH, with its corresponding HARQ-ACK assigned to be transmitted on a resource ending before the start of a different resource for the HARQ-ACK assigned to be transmitted for the first PDSCH, where the two resources are in different slots for the associated HARQ-ACK transmissions, each slot is composed of $N_{sym}^{slot}$ symbols [4] or a number of symbols indicated by subslotLengthForPUCCH-r16 if provided, and the HARQ-ACK for the two PDSCHs are associated with the HARQ-ACK codebook of the same priority."

"In a given scheduled cell, the UE is not expected to receive a first PDSCH, and a second PDSCH, starting later than the first PDSCH, with its corresponding HARQ-ACK assigned to be transmitted on a resource ending before the start of a different resource for the HARQ-ACK assigned to be transmitted for the first PDSCH if the HARQ-ACK for the two PDSCHs are associated with HARQ-ACK codebooks of different priorities."

---

An A/N reporting that does not satisfy the above is referred to as an out-of-order (OoO) HARQ-ACK. With DG PDSCH and SPS PDSCH, a gNB indicates the slot offset $K_1$ in the DCI to determine the slot/sub-slot in which a UE transmits A/N. Therefore, a gNB has full control for avoiding an OoO HARQ-ACK.

With a TDD cell, multiple active SPS configurations per cell and shorter periodicity of SPS configurations down to one slot, it may be likely that the SPS A/N PUCCH may collide with an invalid symbol according to the TDD UL DL configuration, e.g., collision with a DL symbol. In this case, the SPS A/N PUCCH may be deferred to a "later" resource in the same or different slot. Depending on the availability of resources, a deferred PUCCH may be transmitted after an A/N PUCCH corresponding to a DG or SPS PDSCH, which has been received later than the PDSCH corresponding to the deferred PUCCH. In this case, whether this should be considered as an OoO HARQ-ACK should be clearly defined. The in-order operation in Rel-15/16 may be to simplify UE complexity in terms of processing time, pipelining, etc. With a deferred HARQ-ACK, a UE already has sufficient processing time/resources to process the SPS A/N PUCCH, and the UE would have transmitted the SPS PUCCH had it not collided with TDD invalid symbols. Therefore, at least for cases in which the SPS A/N PUCCH may be simply deferred to a later slot, the scenario should be considered as being in-order. In the following methods define UE behavior in these cases.

Case 1—Same Priority Between the A/N of the Two PDSCH

Figure 17:
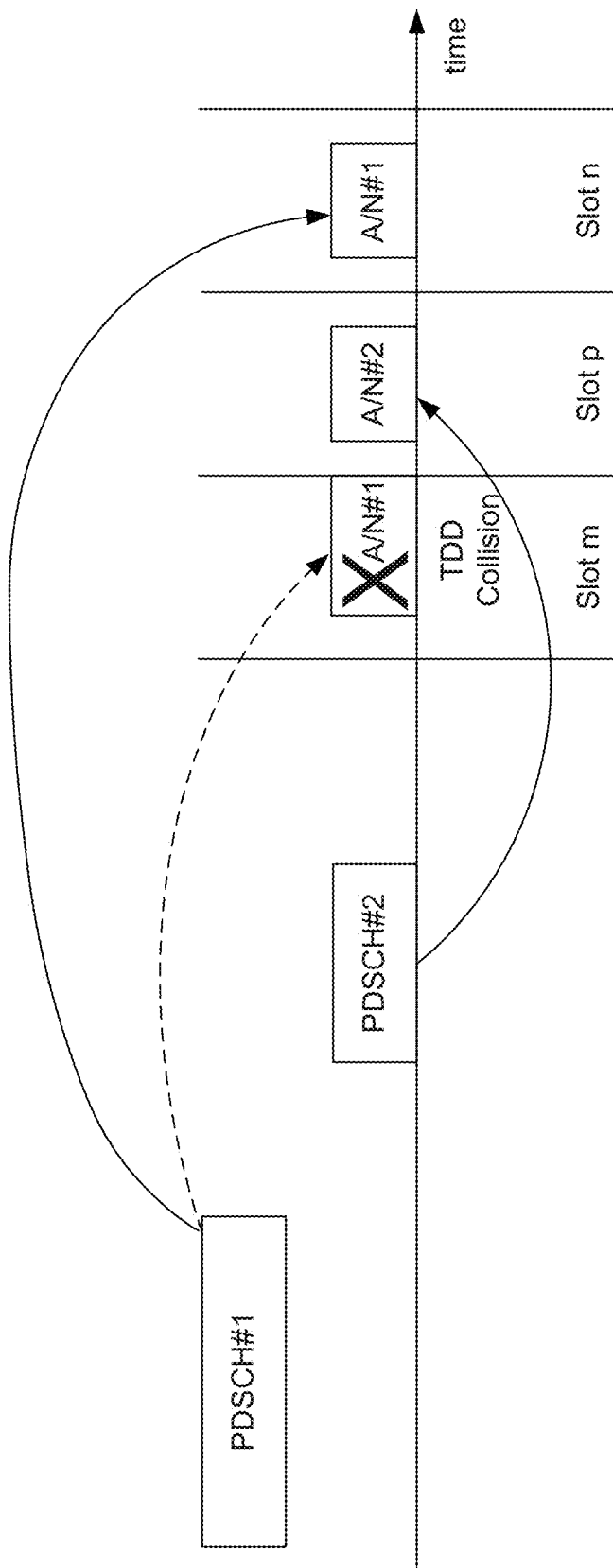
FIG. 17 depicts an example situation in which a SPS PUCCH is deferred to a slot/sub-slot and is not multiplexed with a different PUCCH.

Case 1 is when a SPS PUCCH is deferred to a slot/sub-slot and is not multiplexed with a different PUCCH. Case 1 should be considered as being in order and should be allowed. FIG. 17 depicts an example situation in which a SPS PUCCH is deferred to a slot/sub-slot and is not multiplexed with a different PUCCH. In FIG. 17, A/N PUCCH #1 is in slot dm and A/N PUCCH #2 is in slot p. The A/N PUCCH #1 is deferred to slot n and is not multiplexed. Thus, there may not be any additional UE complexity due to this deferral. The case depicted in FIG. 17 should be considered as being in order and supported.

Method 7-1—Case 1 Defined as In-Order

If a UE defers a SPS A/N PUCCH in slot m due to a collision with a TDD configuration to later slot n>m, then the original PUCCH resource in slot m may be considered to define an in-order or an out-of-order HARQ-ACK reporting. In other words, the following may be supported: 1) a UE receives an SPS PDSCH that starts before a second PDSCH; 2) the original A/N PUCCH of the SPS PDSCH may be indicated to be transmitted in slot m and the PUCCH for the second PDSCH may be transmitted in slot p>m; 3) the SPS A/N PUCCH may be deferred and transmitted in slot n in which n>p; 4) A/N of SPS PDSCH and the second PDSCH are of the same priority; and 5) the original PUCCH resource for SPS A/N PUCCH in slot m collides with invalid symbols due to TDD UL/DL configuration.

Alternatively, the deferred SPS PUCCH resource/slot may be considered to define an in-order or an OoO definition.

Method 7-2—Case 1 Defined as Out-of-Order

If a UE defers a SPS A/N PUCCH in slot m, due to a collision with a TDD configuration to a later slot n>m, then the deferred PUCCH resource in slot n may be considered to define an in-order or an out-of-order HARQ-ACK reporting. In other words, if 1) a UE receives an SPS PDSCH that starts before a second PDSCH; 2) the original A/N PUCCH of the SPS PDSCH may be indicated to be transmitted in slot m and the PUCCH for the second PDSCH may be transmitted in slot p>m; 3) the SPS A/N PUCCH may be deferred and transmitted in slot n; 4) A/N of SPS PDSCH and the second PDSCH are of the same priority; and 5) the original PUCCH resource for SPS A/N PUCCH in slot m collides with invalid symbols due to TDD UL/DL configuration. in which n≤p.

Case 2—Different Priority Between the A/N of the Two PDSCHs

An out-of-order HARQ when the two PDSCHs have different priorities may be defined with respect to the PUCCH resources. The following methods define an OoO for the SPS PUCCH deferral for Case 2.

Method 7-3—Case 2 Defined as In-Order

If a UE defers a SPS A/N PUCCH in slot m due to a collision with a TDD configuration to a later slot n>m, then the original PUCCH resource in slot m may be considered to define an in-order or an out-of-order HARQ-ACK reporting. In other words, the following may be supported: 1) a UE receives an SPS PDSCH that starts before a second PDSCH; 2) the original A/N PUCCH of the SPS PDSCH may be indicated to be transmitted in PUCCH resource #1 in slot m and the PUCCH for the second PDSCH may be transmitted in PUCCH resource #2 in slot p≥m in which PUCCH resource #2 does not end before the start of PUCCH resource #1; 3) the SPS A/N PUCCH may be deferred and transmitted in slot n in which n≥p in a PUCCH resource #3 such that PUCCH resource #2 ends before the start of PUCCH resource #3; 4) A/N of SPS PDSCH and the second PDSCH are of different priority; and 5) the original PUCCH resource for SPS A/N PUCCH in slot m collides with invalid symbols due to TDD UL/DL configuration.

Alternatively, the deferred SPS PUCCH resource/slot may be considered to define an in-order or an OoO definition.

Method 7-4—Case 2 Defined as Out-of-Order

If a UE defers a SPS A/N PUCCH in slot m due to a collision with a TDD configuration to a later slot n>m, then the deferred PUCCH resource in slot n may be considered to define an in-order or an out-of-order HARQ-ACK reporting. In other words, if 1) a UE receives an SPS PDSCH that starts before a second PDSCH; 2) the original A/N PUCCH of the SPS PDSCH may be indicated to be transmitted in PUCCH resource #1 in slot m and the PUCCH for the second PDSCH may be transmitted in PUCCH resource #2 in slot p≥m in which PUCCH resource #2 does not end before the start of PUCCH resource #1; 3) the SPS A/N PUCCH may be deferred and transmitted in slot n in which n≥p in a PUCCH resource #3; 4) A/N of SPS PDSCH and the second PDSCH are of different priority; and 5) the original PUCCH resource for SPS A/N PUCCH in slot m collides with invalid symbols due to TDD UL/DL configuration, then PUCCH resource #2 does not end before the start of PUCCH resource #3.

Problem #8—PUCCH Carrier Switching

Figure 18:
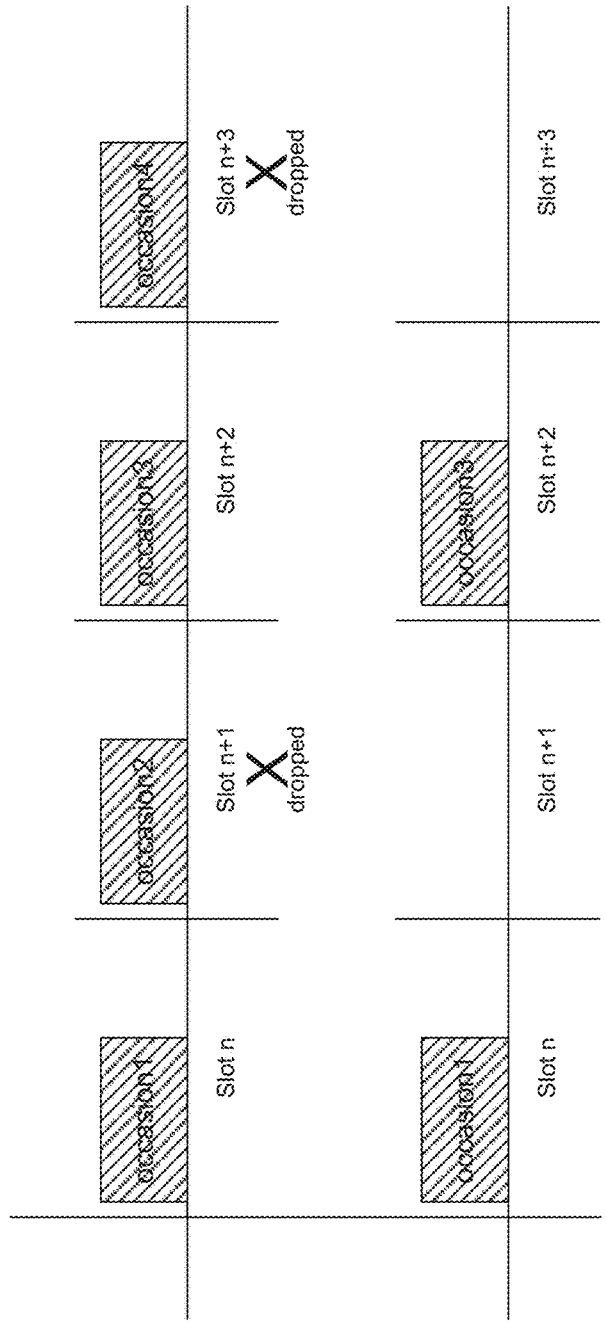
FIG. 18 depicts an example in which a SPS PDSCH is configured with slot-based repetition with aggregation factor of 4.

In a TDD cell, a SPS PDSCH may collide with invalid symbols for PDSCH reception according to a semi-static TDD UL/DL configuration. In case of such collision, the UE may not be expected to receive the SPS PDSCH. The top of FIG. 18 depicts an example in which a SPS PDSCH is configured with slot-based repetition with aggregation factor of 4. At the bottom of FIG. 18, the PDSCH occasions in slot n+1 and n+3 are dropped due to collision with invalid semi-static symbols.

Figure 19:
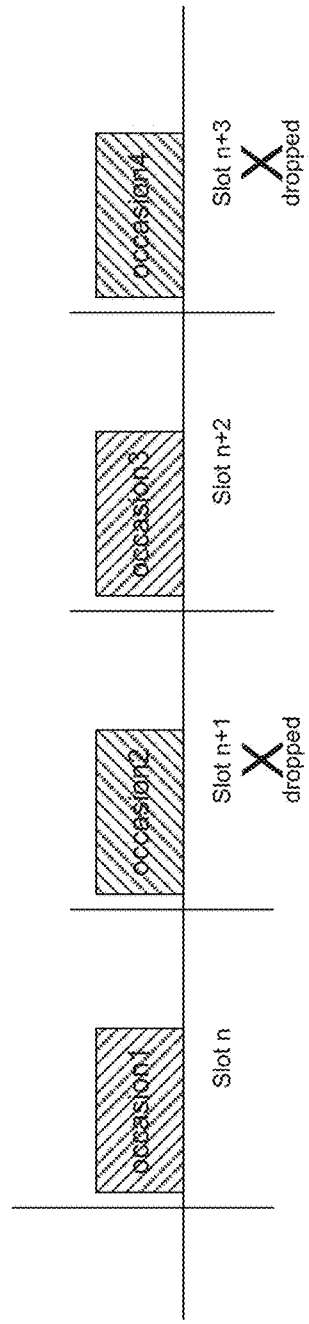
FIG. 19 depicts an example slot-based S-DCI M-TRP PDSCH transmission scheme with aggregation factor=4 according to the subject matter disclosed herein.

SPS PDSCH may be transmitted having two different TCI states just like a DG PDSCH in single-DCI multi-TRP schemes. In such a situation, some occasions of the PDSCH are associated with the first TCI state and some others are associated with the second TCI states. FIG. 19 depicts a single-DCI M-TRP based SPS PDSCH transmission with inter-slot repetition. The PDSCH occasions in slots n and n+2 may be transmitted with the first TCI state and the PDSCH occasions in slots n+1 and N+3 are associated with the second TCI state.

An issue with the current scheme may be when some occasions of the PDSCH are dropped due to collision with invalid symbols. As an example, in FIG. 19, PDSCH occasions in slot n+1 and n+3 are dropped, i.e., not received by the UE. This has a negative impact on the reliability of uRLLC as the beam diversity may no longer be achieved. To maintain the uRLLC reliability for S-DCI PDSCH with repetitions, the current scheme may be modified so that the beam/TCI-state alternates from occasion to occasion. In the following, methods to this end are disclosed.

Method 8-1—Alternating TCI States in SPS PDSCH with Aggregation Factor

In a TDD cell, when a UE is configured to receive SPS PDSCH in a single-DCI multi-TRP scheme having a slot-based repetition in slots 1, 2, . . . , N, in which the PDSCH is associated with two TCI states indicated by the activation DCI or some default TCI state rule, then the UE may receive the PDSCH occasions as follows. Among the N PDSCH occasions in N consecutive slots, an occasion may not be received by the UE if at least one symbol of the occasion overlaps with an invalid symbol according to the TDD configuration. This may result in M≤N received PDSCH occasions.

The TCI states of the M PDSCH occasions may be determined according to any of the methods in Rel-16 for dynamic grant single-DCI M-TRP PDSCH with slot-based repetition. As an example, from the M occasions, the odd occasions (i.e., occasions 1, 3, 5, etc.) may be transmitted with the first TCI state and the even occasions (i.e., occasions 2, 4, 6, etc.) may be transmitted with the second TCI state. This scheme is referred to herein as a "Sequential Scheme."

Figure 20:
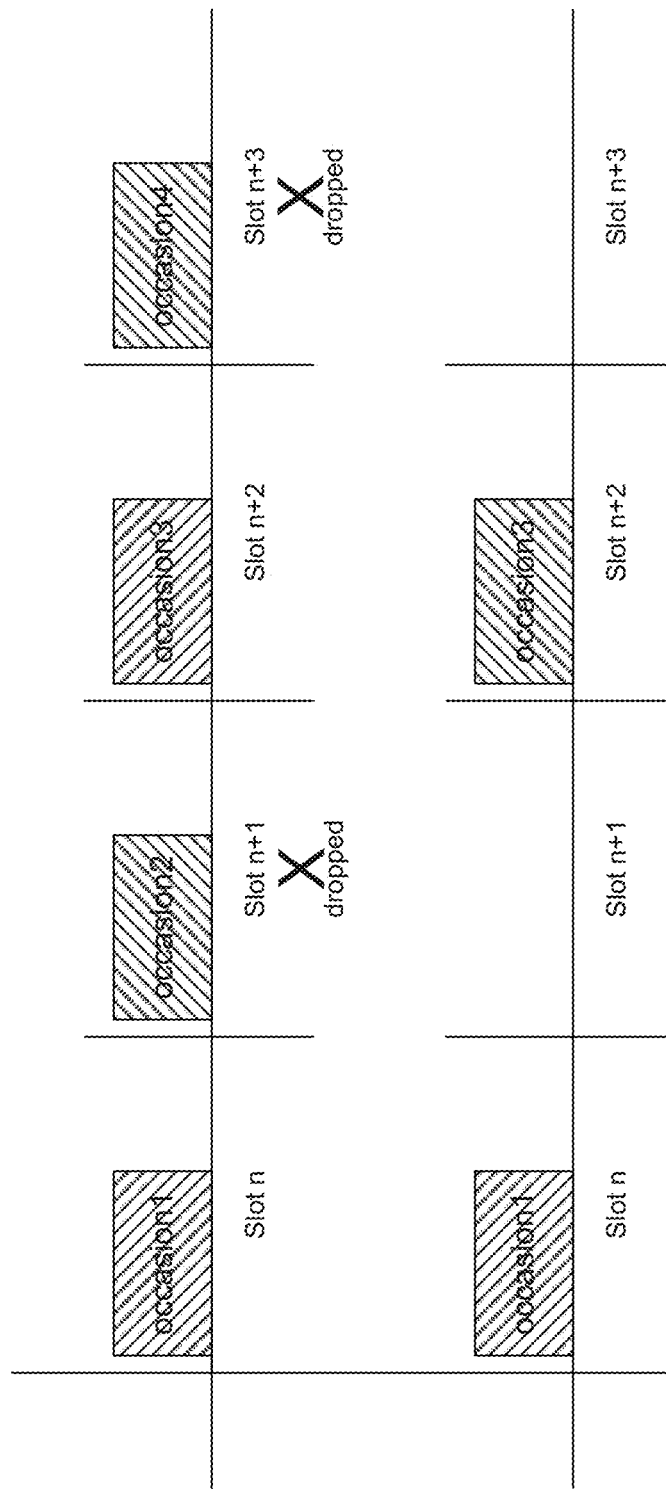
FIG. 20 depicts an example a slot-based S-DCI M-TRP PDSCH transmission scheme with an aggregation factor=4 according to the subject matter disclosed herein.

FIG. 20 depicts a slot-based S-DCI M-TRP PDSCH transmission scheme with an aggregation factor=4. For example, according to Method 8-1 for the scenario shown in FIG. 20, the PDSCH occasion in slot n and the PDSCH occasion in slot n+2 may be respectively transmitted with the first and second TCI states. The scheme of Method 8-1 may be essentially applied to a dynamic grant PDSCH as well.

Method 8-2—Alternating TCI States in DG PDSCH with Aggregation Factor

In a TDD cell, when a UE is scheduled to receive DG PDSCH in a single-DCI multi-TRP scheme having a slot-based repetition in slots 1, 2, . . . , N, in which the PDSCH is associated with two TCI states indicated by the scheduling DCI or some default TCI state rule, then the UE may receive the PDSCH occasions as follows.

Among the N PDSCH occasions in N successive slots, an occasion is not received by the UE if at least one symbol of the occasion overlaps with an invalid symbol according to the TDD configuration. This may result in M<N received PDSCH occasions.

The TCI states of the M PDSCH occasions may be determined according to any of the methods in Rel-16 for dynamic grant single-DCI M-TRP PDSCH with slot-based repetition. For example, from the M occasions, odd occasion (i.e., occasions 1, 3, 5, etc.) may be transmitted with the first TCI state and the even occasions (i.e., occasions 2, 4, 6, etc.) may be transmitted with the second TCI state. This scheme is referred to herein as a "Sequential Scheme."

As can be seen in Methods 8-1 and 8-2, the TCI states may be alternating between the consecutive occasions that have survived. Similar enhancement may be considered with other transmission parameters, e.g., frequency hopping. In particular, in Methods 8-1 and 8-2 frequency hopping may take place among the M survived occasions, i.e., the received PDSCH occasions, as opposed to the original N occasions.

An alternative approach to maintain the reliability of S-DCI M-TRP PDSCH transmission with slot-based repetition may be to perform slot-level deferral.

Method 8-3—Slot-Level Deferral

In a TDD cell, when a UE is configured or scheduled to receive SPS or DG PDSCH in a single-DCI multi-TRP scheme having a slot-based repetition in slots 1, 2, ..., N, in which the PDSCH is associated with two TCI states indicated by the activation or scheduling DCI or some default TCI state rule, then the UE may receive the PDSCH occasions as follows.

Starting from slot 1, the UE determines N slots such that the symbols indicated by the time-domain resource allocation are all valid for PDSCH reception in those slots. The N determined slots may or may not be consecutive. The PDSCH occasions among the determined slots are received assuming no collision with the TDD invalid symbols with alternating TCI states, frequency hopping, etc.

To meet the latency requirement of uRLLC, a maximum deferral time may be introduced for deferring the PDSCH occasions. This scheme is described in Method 8-4.

Method 8-4—Slot-Level Deferral: Maximum Deferral Time

In a TDD cell, when a UE is configured or scheduled to receive SPS or DG PDSCH in a single-DCI multi-TRP scheme having a slot-based repetition in slots 1, 2, ..., N, in which the PDSCH is associated with two TCI states indicated by the activation or scheduling DCI or some default TCI state rule, then the UE may receive the PDSCH occasions as follows.

Starting from slot 1, the UE may determine N slots such that the symbols indicated by the time-domain resource allocation are all valid for PDSCH reception in those slots. The N determined slots may or may not be consecutive. The PDSCH occasions among the determined slots would be received assuming no collision with the TDD invalid symbols. The following may also be applied.

The UE may not be expected to receive any PDSCH occasion among the determined N occasions that ends after a maximum deferral time $T_{deferral}^{max}$ from the end of the last symbol of the original PDSCH occasion in slot N.

In case of deferral, the HARQ-ACK slot offset may be measured from the last received occasion to account for the possible reduction of processing time.

Method 8-5—Slot-Level Deferral: HARQ-ACK Timing

In a TDD cell, when a UE is configured or scheduled to receive SPS or DG PDSCH in single-DCI multi-TRP schemes with slot-based repetition in slots 1, 2, ..., N, in which the PDSCH is associated with two TCI states indicated by the activation or scheduling DCI or some default TCI state rule, then the UE receives the PDSCH occasions according to any of Methods 8-1 through 8-4. A slot timing offset $K_1$ may be equal to the number of slots from the last received PDSCH occasion among the deferred occasions to the slot in which HARQ-ACK PUCCH is transmitted with possible adjustment if the numerology of PDSCH and PUCCH are different. In one embodiment, the slot timing offset $K_1$ may be provided by a scheduling DCI in the case of a dynamic grant PDSCH and an SPS activation DCI in the case of an SPS PDSCH.

As an alternative, the slot offset may be determined from the last deferred occasion that is expected to be received by UE according to the maximum allowed deferral, or the PDSCH processing time.

Problem #9—Type-1 HARQ_ACK Codebook with Intra-Slot PDSCH Repetition Scheme

When a UE is configured to receive PDSCHs according to the intra-slot PDSCH transmission schemes, if the scheduling DCI indicates a TCI codepoint that includes two different TCI states, a UE receives the intra-slot TDM PDSCH scheme, otherwise the UE receives a single PDSCH occasion in the slot as in Rel-15. The set of TCI codepoints may be activated by MAC-CE.

When a UE is configured to receive intra-slot PDCSH repetition, the UE may be configured with a number of symbols K via an RRC via RRCI or K may be defined as a fixed number in the specification. The scheduling DCI indicates a particular row of the time-domain resource allocation (TDRA) table. The first PDSCH occasion is transmission in the indicated resources and the second occasion starts K symbols after the end of the first occasion with the same number of symbols and same RBs as the first occasion, i.e., two identical occasions with K symbols gap in between.

Figure 21:
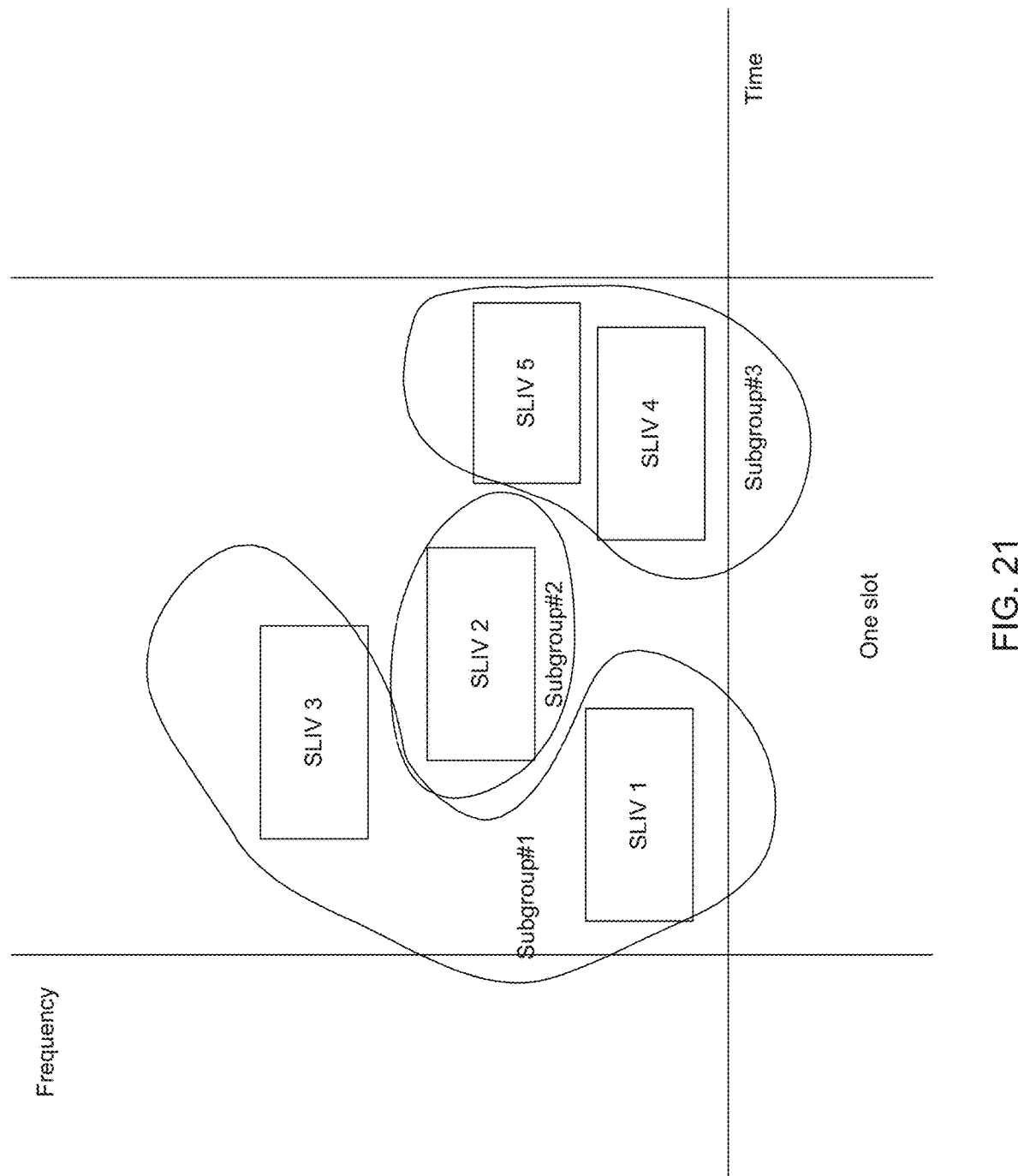
FIG. 21 depicts an example of subgroup determination with a TDRA table with 5 rows of start and length indicator values with three subgroups.

With a Type-1 HARQ-ACK CB, the UE groups the set of rows of the TDRA table to define the type-1 start and length indicator value (SLIV). The SLIV having the smallest end symbol may be referred to herein as the reference SLIV, and every other SLIV having a start symbol that may be less than or equal to the end symbol of the reference SLIV, i.e., every SLIV with overlaps with the reference SLIV, are grouped with the reference SLIV to form a type-1 subgroup. This subgroup may then be removed from the TDRA table and the same procedure is again applied to define the remaining type-1 subgroups. The UE may be expected to receive at most one PDCH in each type-1 subgroup. One A/N bit is reserved for each subgroup. FIG. 21 depicts an example of subgroup determination with a TDRA table with 5 rows (SLIVs) with three subgroups.

Current construction of type-1 subgroups may be too redundant with the intra-slot TDM PDSCH scheme. If the set of codepoints activated by MAC-CE does not include any codepoints with a single TCI state, this means the UE may only receive the intra-slot PDCSH scheme. For the intra-slot scheme, the set of SLIVs in the TDRA table do not represent the actual set of symbols in which the UE receives the PDSCH. Instead, the set of SLIVs should be extended to account for PDSCH repetition. For example, assuming a gap K=0, an SLIV that indicates a PDSCH reception at symbols {3,4,5,6} should be extended to an extended SLIV {3,4,5,6,7,8,9,10} as a second occasion is received immediately after the first occasion. If K=2, then the extended SLIV would be {3,4,5,6,9,10,11,12}.

Figure 22:
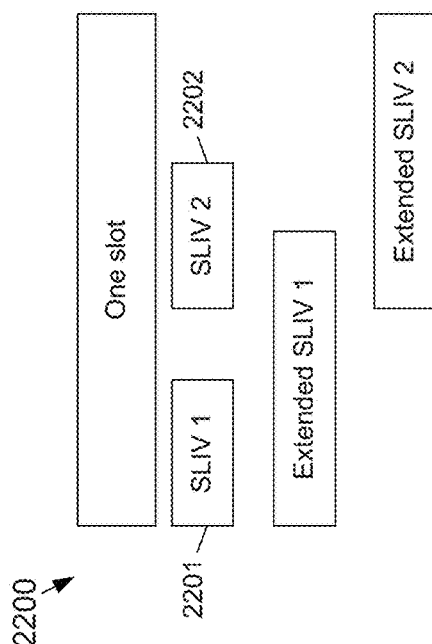
FIG. 22 depicts an example time-domain resource allocation.

To see how the current Type-1 HARQ-ACK codebook (CB) may be redundant, consider a TDRA table 200 having two SLIV rows depicted in FIG. 22. With such a TDRA table and assuming only an intra-slot TDM PDSCH scheme is possible, a UE may only receive one PDCSH in the slot. If the DCI indicates SLIV1, the PDCSH may be received on an extended SLIV1 in which case no DCI may schedule SLIV2 as it overlaps with the extended SLIV1. Similarly, if SLIV2 is indicated, an extended SLIV 1 cannot be received. Therefore, a single A/N bit may be sufficient for this slot, while current subgrouping constructs two subgroups, one with SLIV 1 and one with SLIV 2 and reserves two A/N bits unnecessarily.

With the symbol gap K configured, the extended set of SLIVs may be such that the extended SLIVs do not overlap and, therefore, the UE may be able to receive both extended SLIVs in the slot depending on UE capability. This is shown in the right column of FIG. 23.

A procedure is described below for redefining type-1 CB and conditions for proper functioning of that.

Method 9-1—Defining the Extended SLIV Considering the Inter-Repetition Gap K

For each SLIV={i, i+1, ..., i+L−1} corresponding to a configured TDRA table for PDSCH reception on symbols i to i+L−1, then a UE may determine an extended $SLIV_E$ as {i, i+1, . . . i+L−1, i+L+K, i+L+K+1, . . . , i+2L+K−1} in which K is the number of symbols between the two occasions. The set of extended SLIVs may be used in place of the original set of SLIVs given by the TDRA table to construct the Type-1 subgroups. That is, no original SLIV is considered to define the Type-1 subgroups. Determination of a Type-1 subgroup may depend on the value of time gap K.

Method 9-2—Type-1 Subgroup Definition: Independent of

For a set of extended SLIVs, once a reference extended SLIV having the smallest end symbol has been selected, then every other extended SLIV with a start symbol that is less than or equal to the end symbol of the reference extended SLIV may be placed in the same subgroup as the reference extended SLIV regardless of the value of time gap.

Figure 23:
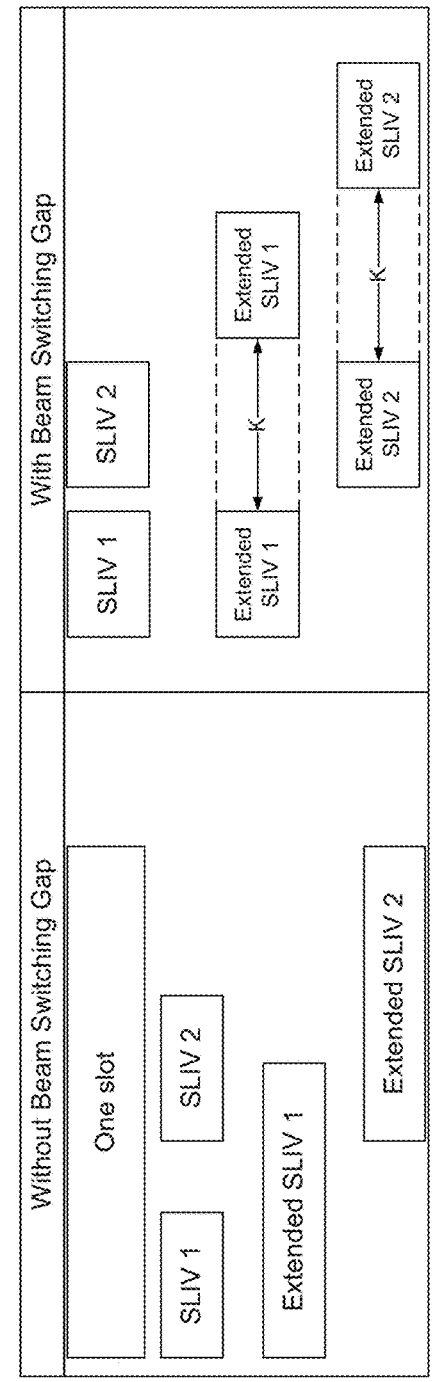
FIG. 23 depicts another example time-domain resource allocation with a symbol gap K configured so extended set of start and length indicator values do not overlap.

As shown in FIG. 23, it may be that the extended SLIVs do not actually overlap on the same set of symbols. In this case, a more efficient approach may be to allow UE to receive both extended SLIVs and construct the subgroups accordingly.

Method 9-3—Type-1 Subgroup Definition: K-Dependent

For a set of extended SLIVs, once a reference extended SLIV having the smallest end symbol has been selected, then every other extended SLIV with start symbol less than or equal to the end symbol of the reference extended SLIV may be placed in the same subgroup as the reference extended SLIV, if the second SLIV overlaps with the first SLIV on at least one symbol.

As an example of an application of Method 9-3, the two extended SLIVs in the right column of FIG. 23 are placed in two different subgroups as they do not overlap on any symbols in the slot.

Another important aspect of the enhancement may be the possibility of receiving both intra-slot PDSCH and Rel-15 single-occasion PDSCH in the slot. If such possibility exists, a UE should only consider the original SLIVs, or equivalently consider the union of the original SLIVs and the extended SLIVs to construct the Type-1 subgroups. Conditions for different subgroup method applications follow.

Method 9-4—Apply the Extended SLIV Based on MAC-CE TCI State Codepoint Activation If a UE is configured to receive intra-slot PDSCH repetition on a given serving cell, then the UE may apply the extended SLIVs for the purpose of a Type-1 HARQ-ACK CB construction if the set of activated TCI codepoints by MAC-CE only includes TCI codepoints having two different TCI states.

For Method 9-4, the DCI may only schedule an intra-slot PDSCH repetition scheme, if a MAC-CE has not activated any codepoint with single TCI state. Alternatively, a gNB may configure a UE via an RRC to indicate to UE to apply the extended SLIVs or the original SLIVs.

For yet another alternative, a UE may apply the new set of extended SLIVs if any of TCI codepoint includes two TCI states. It may be the responsibility of the gNB to not transmit more PDSCHs than the number of reserved A/N bits according to the extended SLIV subgroups.

Method 9-4-1—Apply the Extended SLIV Based on MAC-CE TCI State Codepoint Activation If a UE is configured to receive intra-slot PDSCH repetition on a given serving cell, then the UE may apply the extended SLIVs for the purpose of Type-1 HARQ-ACK CB construction if any of the TCI codepoint includes two TCI states.

Method 9-5—Apply the Extended SLIV Based on RRC Configuration

If a UE is configured to receive intra-slot PDSCH repetition on a given serving cell, then the UE may be configured via RRC with an indicator that indicates to UE to apply either the original set of SLIVs or the extended set of SLIVs for type-1 HARQ-ACK CB construction. Alternatively, a UE may always apply the extended SLIVs. Since applying the extended SLIVs may result in fewer reserved HARQ-ACK bits in the slot, it may be the responsibility of a gNB to schedule PDSCHs according to the number of reserved A/N bits.

Method 9-6—Always Apply the Extended SLIV+Limit Maximum Number of PDSCHs Per Slot If a UE is configured to receive intra-slot PDSCH repetition on a given serving cell, then the UE may apply the extended set of SLIVs for Type-1 HARQ-ACK CB construction.

If application of the set of extended SLIVs results in N reserved A/N bits in slot, then a UE may be expected to receive at most N PDSCHs per slot, i.e., a gNB does not schedule the UE via DCI or SPS PDSCH with more than N PDSCHs per slot.

If a UE declares a capability to receive M PDSCHs per slot in which M<N, then the UE may reserve M A/N bits per slot.

An aspect to consider for Method 9-6 is that a Type-1 HARQ_ACK CB is semi-static and may only be impacted by RRC configuration, whereas the activation of the set of TCI codepoints may be via MAC-CE, which is more dynamic. Any scenario in which a gNB activates a set of codepoints that may impact the determination of the number of subgroup in the middle of an ongoing HARQ_ACK session ought to be avoided. A practical way of achieving this may be to introduce a timeline from the reception of the MAC CE command in which the UE determines the subgroups according to the new set of activated TCI codepoint. In this way, there may be a common understanding between a UE and a gNB as to how subgroups are constructed. The gNB may further control the actual number of scheduled PDSCHs if needed.

Method 9-7—Timeline for MAC CE

If a UE is configured to receive intra-slot PDSCH repetition on a given serving cell, then the UE may apply the extended set of SLIVs for Type-1 HARQ-ACK CB based on the set of activated TCI code points.

If a UE receives a MAC CE command for activation of the set of TCI codepoint, then the UE may apply the activated TCI codepoints for determining the Type-1 subgroups from the first slot that is after k+T in which k is the slot that the UE would transmit a PUCCH with HARQ-ACK information for the PDSCH providing the MAC CE command, and T is a fixed or RRC configured number in number of slots. One example of T may be $3N_{slot}^{subframe,\mu}$ in which $N_{slot}^{subframe,\mu}$ is the number of slots per sub-frame and μ is the SCS numerology of the PUCCH cell.

Problem #10—PUCCH Carrier Switching

When a cell is a TDD cell, the following observations may be made. With multiple active SPS configurations per cell and multiple values of $K_1$ indicated in the activation DCIs, there may be multiple periodic SPS HARQ-ACK PUCCH transmissions. Hence, it may be likely that some SPS PUCCHs may collide with invalid TDD symbols and may be dropped. A gNB may indicate a PUCCH resource for DG A/N in the SPS PUCCH slot to override the resource based on the available symbols. If the number of appended DG A/N is too large, there may not be enough resources for PUCCH transmission. Based on the configured values of $K_1$ and the semi-static slot formats, the net available slot(s) on the PUCCH cell may be too late.

Based on these observations, it may be useful to allow for PUCCH carrier switching. With PUCCH carrier switching, a gNB may indicate to the UE to transmit the PUCCH in a specific component carrier (CC) based on a dynamic indication in the scheduling DCI, based on some semi-static rule based on a TDD configuration on candidate PUCCH cells, or a combination of both approaches. In general, the following advantages for a PUCCH carrier switching may include a reduced latency for different UL/DL configurations, a dynamic load balancing and f-selective gain, use of a CC having a higher reliability, and/or an improved network capacity/efficiency that reduces resource utilization.

Figure 24:
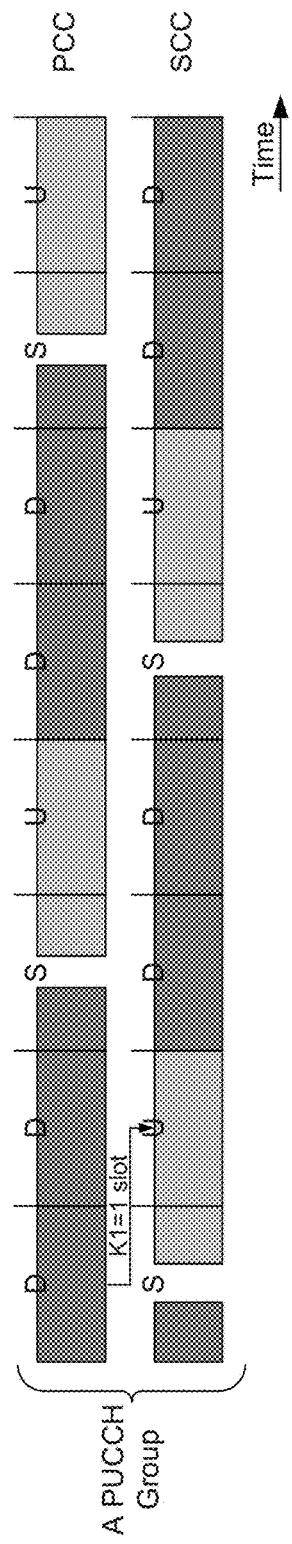
FIG. 24 depicts an example of PUCCH carrier switching in which the PUCCH overrides a resource timeline $N_3$.

FIG. 24 depicts an example of PUCCH carrier switching in which the PUCCH overrides a resource timeline $N_3$. For a PDSCH scheduled in the first slot on a Policy and Charging Control (PCC) framework, it may not be possible to schedule PUCCH in the second slot of a PCC, i.e., with $K_1=1$, because the second slot is a downlink slot. To meet a desired latency, a scheduling DCI may indicate the PUCCH carrier to be in a Session and Service Control (SCC) framework. In this case, a UE may transmit the PUCCH in the second slot of SCC.

Issue 1: PUCCH Overriding Resource Timeline $N_3$.

Rel-15/16 defines the HARQ-ACK PUCCH resource overriding timeline as below.

---

TS 38.213:
"If a UE determines a first resource for a PUCCH transmission with HARQ-ACK information corresponding only to a PDSCH reception without a corresponding PDCCH or detects a first DCI format indicating a first resource for a PUCCH transmission with corresponding HARQ-ACK information in a slot and also detects at a later time a second DCI format indicating a second resource for a PUCCH transmission with corresponding HARQ-ACK information in the slot, the UE does not expect to multiplex HARQ-ACK information corresponding to the second DCI format in a PUCCH resource in the slot if the PDCCH reception that includes the second DCI format is not earlier than $N_3 \cdot (2048 + 144) \cdot \kappa \cdot 2^{-\mu} \cdot T_c$ from the beginning of a first symbol of the first resource for PUCCH transmission in the slot where, $\kappa$ and $T_c$ are defined in clause 4.1 of [4, TS 38.211] and $\mu$ corresponds to the smallest SCS configuration among the SCS configurations of the PDCCHs providing the DCI formats and the SCS configuration of the PUCCH."

---

Clause 4.1 of TS 38.211 states that unless otherwise noted, the size of various fields in the time domain is expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

Figure 25:
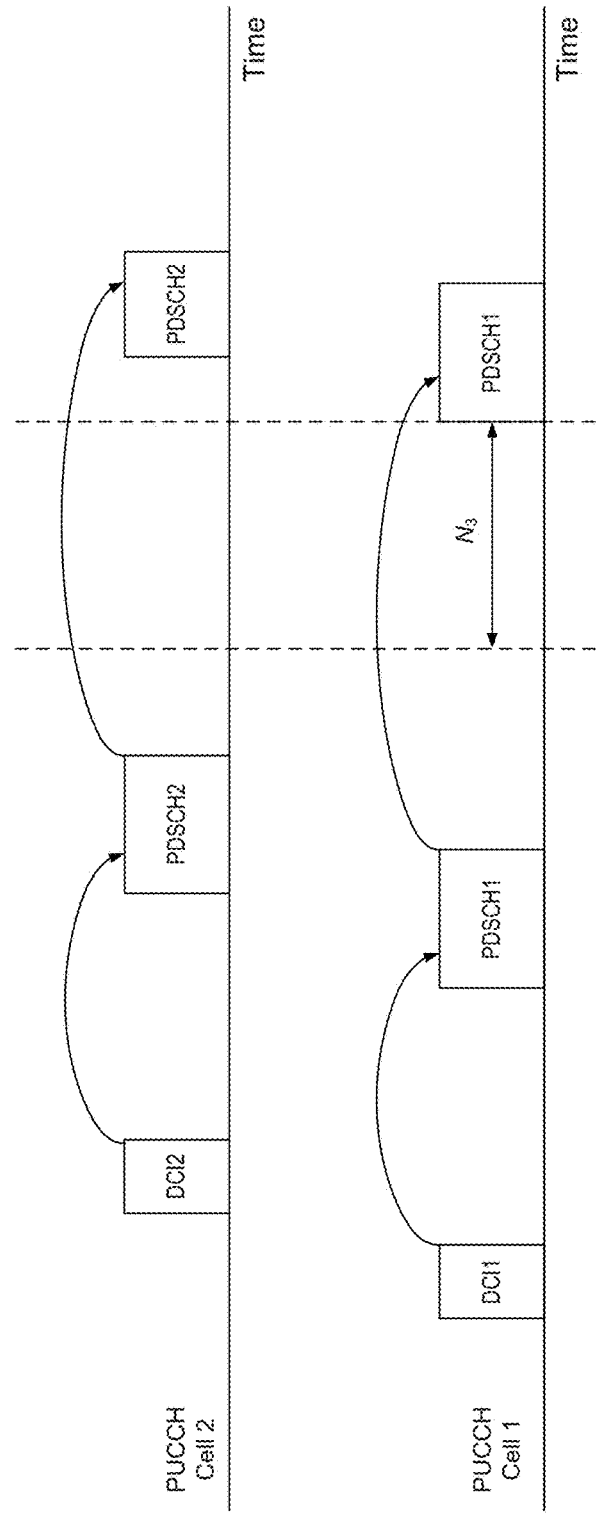
FIG. 25 depicts an example of a scheduled PDSCH and corresponding first PUCCH in a first cell and a subsequent scheduling of a second PUCCH in a second cell with a new carrier.

In FIG. 25, a DCI 1 schedules a PDSCH 1 and the corresponding PUCCH 1 in Cell 1, and later the DCI 1 has scheduled a PDSCH 2 that originally would be transmitted in a PUCCH resource 2 in the same slot as PUCCH 1 on Cell 1, but the gNB indicates a new carrier, i.e., Cell 2. In response, a UE cancels the PUCCH 1 transmission on Cell 1 and multiplexes both A/N bits in PUCCH 2 in Cell2. An overriding resource time $N_3$ provides sufficient time for the UE to cancel the PUCCH 1 and prepare for transmission of overridden resource. In Rel-15, the overridden resource is on the same PUCCH cell. If PUCCH carrier switching is allowed, the overriding resource time according to $N_3$ should involve the numerology of the initial PUCCH cell and the switched PUCCH cell.

Method 10-0—HARQ-ACK PUCCH Resource Overriding Timeline

If a UE determines a PUCCH transmission with HARQ-ACK information only for SPS PDSCHs or detects a first PDCCH scheduling a DG PDSCH and a first PUCCH resource with HARQ-ACK information on a first PUCCH cell with SCS numerology of $\mu_1$, and also detects at a later time a second DCI via a second PDCCH reception indicating a second PUCCH resource on a second PUCCH cell with SCS numerology of $\mu_2$ for multiplexing of the first and second HARQ-ACK bits in which the indication of the second PUCCH cell may be either dynamic or semi-static or implicit, then the UE may not expect to multiplex the HARQ-ACK bits for the second DCI in the second PUCCH resource if: (1) the PDCCH reception that includes the second DCI does not end earlier than $N_3 \cdot (2048+144) \cdot \kappa \cdot 2^{-\mu} \cdot T_c$ from the start of the first symbol of the first PUCCH resource; (2) $\mu$ is the smallest SCS numerology between the SCS of the PDCCHs providing the DCI formats of the SCS of the first PUCCH cell and SCS of the second PUCCH cell; (3) $N_3 \cdot (2048+144) \cdot \kappa \cdot 2^{-\mu} \cdot T_c$ is in the units of seconds, and can be replaced by any time duration $T_3$ considering the SCSs defined above; and (4) $T_c$ and $\kappa$ are defined in clause 4.1 of TS 38.211.

Method 10-1—HARQ-ACK PUCCH Resource Overriding Timeline

If a UE determines a PUCCH transmission with HARQ-ACK information only for SPS PDSCHs or detects a first PDCCH scheduling a DG PDSCH and a first PUCCH resource with HARQ-ACK information on a first PUCCH cell with SCS numerology of $\mu_1$, and also detects at a later time a second DCI via a second PDCCH reception indicating a second PUCCH resource on a second PUCCH cell with SCS numerology of $\mu_2$ for multiplexing of the first and second HARQ-ACK bits, in which the indication of the second PUCCH cell can be either dynamic or semi-static or implicit, then UE may not expect to multiplex the HARQ-ACK bits for the second DCI in the second PUCCH resource if: (1) the PDCCH reception that includes the second DCI does not end earlier than $N_3 \cdot (2048+144) \cdot \kappa \cdot 2^{-\mu} \cdot T_c$ from the start of the first symbol of the first PUCCH resource; (2) $\mu$ is the smallest SCS numerology between the SCS of the second PDCCH, the SCS of the first PUCCH cell and SCS of the second PUCCH cell; (3) $N_3 \cdot (2048+144) \cdot \kappa \cdot 2^{-\mu} \cdot T_c$ is in the units of seconds, and may be replaced by any time duration $T_3$ considering the SCSs defined above; and (4) $T_c$ and $\kappa$ are defined in clause 4.1 of TS 38.211.

In an alternative embodiment, the numerology of the PDCCHs may not be considered in Methods 10-0 and 10-1. That is, $\mu$ is the smallest SCS numerology between the SCS of the first PUCCH cell and SCS of the second PUCCH cell may not be considered.

In another alternative embodiment, the PDSCH processing time, i.e., the time from the end of the PDSCH to the start of the PUCCH carrying its HARQ-ACK bit, depends on the numerology of first PUCCH cell. In particular, in Methods 10-0 and 10-1, the minimum time from the end of PDCSH 2 to the start of PUCCH 2 may be determined based on the numerology of 1) the second PDCCH, 2) the second PDSCH, 3) the second PUCCH, and 4) the first PUCCH. That is, the minimum time from the end of PDSCH 2 to the start of PUCCH 2 may be determined based on the numerology of all of the listed items.

In still another alternative embodiment, the PUCCH carrier only changes from codebook to codebook (CB to CB). That is, a first PUCCH carrier is determined for a current CB, but does not change until a new HARQ-ACK CB is started, i.e., different PUCCH slot is indicated. This is to ensure that PUCCH resource overriding does not take place within the same CB. Note that if PUCCH carrier changes from CB to CB, no extra consideration of additional numerologies are needed because the cancellation and overriding are within the same numerology.

Method 10-2—HARQ-ACK PUCCH Resource Overriding Timeline: PUCCH Carrier Switching within a CB does not Take Place A UE may not be expected to be indicated to transmit a first PUCCH with first HARQ-ACK information only for SPS PDSCHs or detect a first PDCCH scheduling a DG PDSCH and a first PUCCH resource with a first HARQ-ACK information on a first PUCCH cell, and also detect at a later time a second DCI via a second PDCCH reception indicating a second PUCCH resource with second HARQ-ACK information on a second PUCCH cell if a) the first and second PUCCH cells are different and b) the first and second HARQ-ACK information belong to the same HARQ_ACK codebook. In other words, PUCCH carrier switching may only be allowed across different HARQ-ACK codebooks. This method may be further relaxed to only allow PUCCH cell switching when the numerologies are the same.

Method 10-3—HARQ-ACK PUCCH Resource Overriding Timeline: PUCCH Carrier Switching within a Codebook does not Take Place A UE may not be expected to be indicated to transmit a first PUCCH with first HARQ-ACK information only for SPS PDSCHs or detect a first PDCCH scheduling a DG PDSCH and a first PUCCH resource with first HARQ-ACK information on a first PUCCH cell with numerology $\mu_1$, and also detect at a later time a second DCI via a second PDCCH reception indicating a second PUCCH resource with second HARQ-ACK information on a second PUCCH cell with numerology $\mu_2$ if a) $\mu_1$ is not equal to $\mu_2$ and b) the first and second HARQ-ACK information belong to the same HARQ_ACK codebook. Method 10-3 may be modified to replace a) with "$\mu_1 < \mu_2$" or "$\mu_1 > \mu_2$".

Issue 2: How does UE Determine Whether the HARQ-ACK CB is Restarted or it is Just a Switch?

Suppose M PUCCH cells are configured with possibly different numerologies. Consider a dynamic indication of the PUCCH carrier in the scheduling DCI. The set of slot offset $K_1$ may be interpreted in the numerology of the indicated PUCCH cell. To allow for full flexibility of a gNB, the set of $K_1$ may be configured separately for each PUCCH cell.

For a Type-2 codebook, a UE may determine the set of Monitoring Occasions MOs for possible PDCCHs scheduling PDSCHs having A/N transmitted in a PUCCH slot. An MO is a set of symbols in the slot in which a UE monitors PDCCH, and is given via a RRC by search space (SS) configuration. For example, if a UE is configured with an SS that indicates symbol 2, 3, 4 in the slot (CORESTE length=3), the UE monitors length-3 PDCCH candidates in those three symbols in the slot. In this case, it may be said that there is an PDCCH MO in those symbols A UE determines the set of MOs according to the configured TDRA tables of the scheduled cells (the value of PDCCH to PDSCH slot offset $K_0$) and the set of all possible $K_1$ values. With multiple PUCCH cells, a UE determines the set of MOs according to the set of TDRA tables and the set of $K_1$ values of all the PUCCH cells. Note that different $K_1$ sets as well as different SCS of the PUCCH cells, may introduce some new MO indices in the HARQ-ACK codebook.

An important aspect of PUCCH carrier switching is how a Type-2 HARQ-ACK may be constructed. Any impact on the codebook construction should be carefully addressed. In Rel-15, a Type-2 CB is constructed based on the notion of counter downlink-assignment index (C-DAI) and total DAI (T-DAI). C-DAI counts the number of PDCCHs having an A/N reported in the same PUCCH. C-DAI may be reset from HARQ-ACK CB to HARQ-ACK CB, or from PUCCH slot to PUCCH slot. PUCCHs that a UE transmit in different slots belong to different HARQ-ACK CBs, so their DAI values in the corresponding DCIs may be unrelated and counted separately. With multiple PUCCH cells with different numerologies, there ought to be a clear understanding between UE on whether the HARQ-ACK CB is still ongoing and multiplexing on new carrier should be done or a new HARQ-ACK has started.

When the numerologies of the PUCCH cells are the same, if DCI 1 schedules a PUCCH in slot n of PUCCH cell 1 and DCI 2 schedules a PUCCH in slot m of PUCCH cell 2, the DCI 2 indicates a PUCCH carrier switching if and only if m=n, i.e., same slot. Otherwise the two PUCCHs correspond to two different HARQ-ACK CBs and their DAIs are counted independently. In other words, PUCCHs in overlapping slots may be assumed to be in the same HARQ-ACK CB.

When the numerologies of the PUCCH cells are different, the notion of overlapping slots should have a clear definition.

Method 10-4—Lowest SCS Among the PUCCH Cell is Considered as Same CB Indicator

If a UE is configured with M PUCCH cells having the same or different numerologies, a first DCI and a second DCI scheduling a first and a second PDSCHs are within the same HARQ-ACK CB if their corresponding PUCCH resources are within the same slot of the PUCCH cell with smallest numerology among the M cells.

Figure 26:
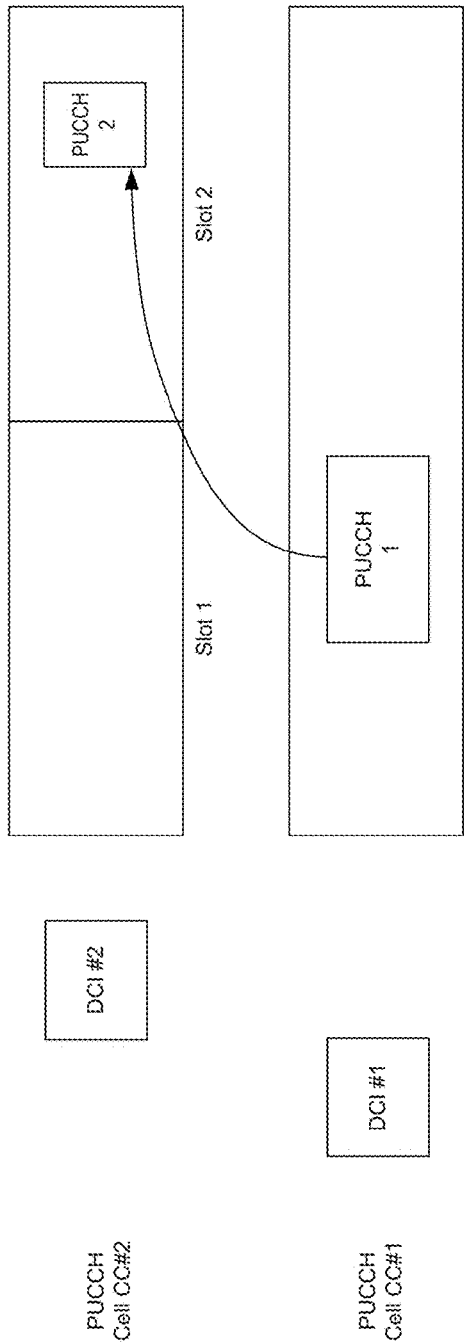
FIG. 26 depicts an example of two DCIs that are within the same HARQ-ACK codebook with M=2.

FIG. 26 depicts an example with M=2. The two DCIs are within the same HARQ-ACK CB, as the two PUCCH resources fall within the same slot of CC #1. In this case, the C-DAI values the two DCIs respectively take values of 1 and 2. Note that if the two PUCCHs are considered to be different CBs, the C-DAI values would be 1 and 1, respectively.

Figure 27:
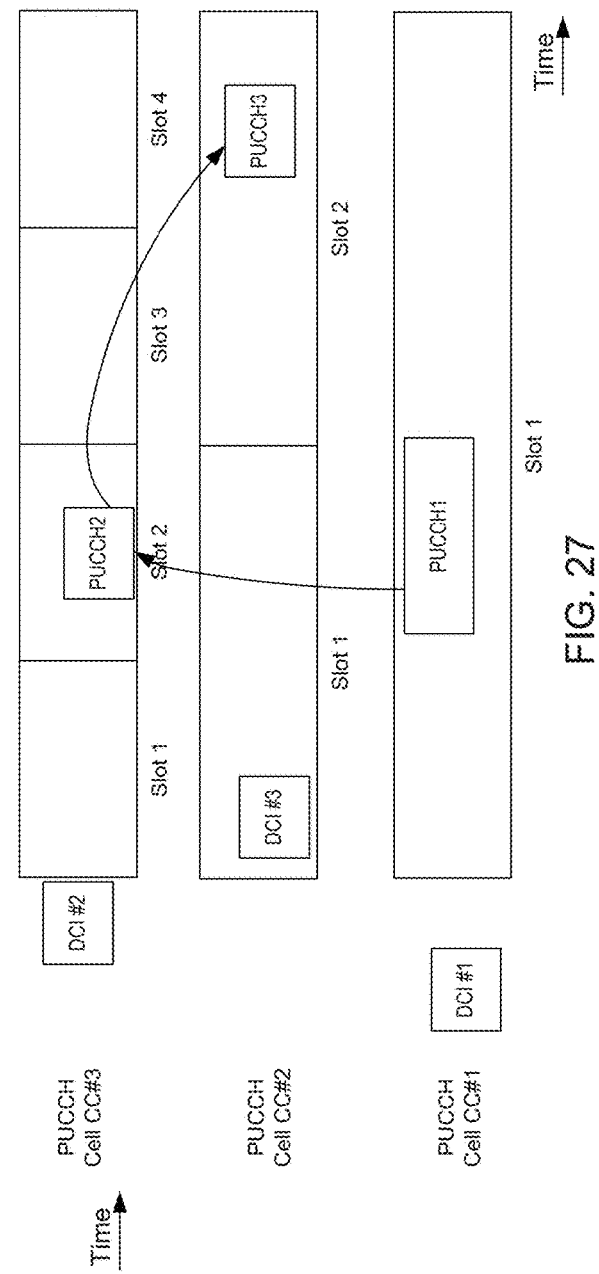
FIG. 27 depicts an example of three PUCCHs that are with the same codebook.

With Method 10-4, it may be that DCIs indicating PUCCHs in different slots of a PUCCH cell may be within the same HARQ-ACK CB. An example may be when a third PUCCH is added to slot 1 in FIG. 26 scheduled by a third DCI. Another example is shown in FIG. 27 in which all three PUCCHs are within the same CB, i.e., the DAI values of three DCIs are respectively 1, 2 and 3. Note that if a UE misses the first DCI, it will have two PUCCHs, with corresponding C-DAI values of 2 and 3 in different slots. The UE will know, however, that they correspond to the same HARQ-ACK CB, and one DCI is missed based on the two DAI values.

If a UE is configured with M PUCCH cells with the same or different numerologies, the UE may construct a Type-2 HARQ-ACK CB by considering, across the PUCCH cells, all the MOs across the downlink cells determined based on the union of the MOs determined based on the set of PDSCH-to-PUCCH HARQ-ACK timing set $K_1$ with the numerology of each PUCCH cell and the configured rows of the TDRA tables. Once the UE determines the set of MOs, the HARQ-ACK CB may be constructed by a DAI operation, in which all of the PDSCHs having A/N bits are indicated to be transmitted within certain slots across the M PUCCH cells, are assumed to belong to the same HARQ-ACK CB. The certain slots may be determined according to Method 10-4. Alternatively. the same slots may be those that overlap with the first or the last slot of the cell having the largest numerology (or the smallest numerology).

Similar consideration is needed for a Type-1 HARQ-ACK CB in which the CB is constructed based on all the union of K1 sets across the M PUCCH cells to determine the set of PDSCH candidates for given scheduled cell.

A gNB may avoid changing of the PUCCH cell dynamically for the same HARQ-ACK CB PUCCH without significant restriction. The gNB may simply keep the same PUCCH cell for all the A/N bits multiplexed in the same PUCCH slot and, if needed, change the PUCCH cell for the new CB session to a new cell. Therefore, cross-cell multiplexing of HARQ-ACK bits may not be needed at least for the DG A/N bits. However, for the SPS PDSCH, the PUCCH cell may be determined once and kept unchanged until the SPS configuration is active. In this case, even if the gNB does not change the PUCCH cell for DG PDSCHs, a UE may multiplex the SPS A/N bits in a PUCCH on cell 1 with DG A/N bits in a PUCCH on cell 2 and transmit the final PUCCH on cell 2, as indicated by the DCI.

Multiplexing the SPS HARQ-ACK PUCCH in cell 1 with a PUCCH on cell 2 that carries HARQ-ACK bits for DG PDSC(s) is supported in which cell 2 may be indicated by DCI scheduling the DG PDSCHs. The multiplexed PUCCH may be transmitted on cell 2.

Issue 3: PUCCH Carrier or SPS PDSCH A/N without a PDCCH

With dynamic indication of the PUCCH cell, a field in the scheduling DCI may be used to indicate one of the configured PUCCH cells. For SPS PDSCHs without a PDCCH, there is no field in the DCI. In this case, there may be a number of possibilities to determine the PUCCH cell for the SPS A/N PUCCH. The following methods may define UE behavior for SPS HARQ-ACK PUCCH.

Method 10-5—PUCCH Cell for the SPS HARQ-ACK PUCCH Transmission

If a UE is configured with dynamic PUCCH cell switching, the PUCCH cell for HARQ-ACK transmission of a SPS PDSCH without PDCCH may be the same as PUCCH cell for HARQ-ACK transmission of the SPS PDSCH with the PDCCH. Either of the following two options are possible.
Option 1: the PUCCH cell is indicated in the activation DCI.
Option 2: PUCCH cell is configured per SPS configuration.

It may also be possible that the PUCCH cell may be configured per SPS configuration via RRC. In this case, if the activation DCI indicates a different PUCCH cell, a UE determines the PUCCH cell based on the activation DCI, i.e., activation DCI overrides RRC.

Problem #11—SPS HARQ-ACK PUCCH Dropping: Latency and Configuration Aspects

The HARQ-ACK bits for SPS PDSCHs without a PDCCH may be transmitted in slots determined by the slot offset $K_1$ in the activation DCI of the SPS PDSCH. That is, once a gNB activates a SPS PDSCH configuration and the corresponding HARQ-ACK slot offset, the gNB no longer has control on the slot offset for the subsequent SPS PDSCHs until the gNB releases/reactivates the SPS configuration. In a TDD cell, the SPS HARQ-ACK PUCCHs may collide with invalid symbol, e.g., DL symbols, specified by the TDD configuration. Since the HARQ-ACK PUCCH carries an important type of UCI, it has been agreed for Rel-17 that in case of a collision with the invalid TDD symbols, a UE defers the HARQ-ACK PUCCH to the next available slot. Such a deferral was already defined for PUCCH repetition in Rel-15, but was absent for a single slot PUCCH repetition. In the following, a single slot PUCCH repetition is the focus.

Different SPS configurations may be configured by a gNB to accommodate different traffics having different statistics, packet expiration time, latency budget, and so on. Therefore, whether the SPS HARQ-ACK PUCCH is deferred or dropped should be configured per SPS configuration.

When the SPS HARQ-ACK PUCCH is deferred, a maximum number of slots may be determined to ensure that the PUCCH is not deferred beyond a certain delay to ensure the latency is within a maximum limit. Different SPS configurations may typically have different latency budgets according to the associated traffic type. Therefore, it may be natural to define the maximum deferral slot $K_{def}$ per SPS configuration. For a PUCCH carrying only HARQ-ACK bits of a certain SPS configuration in original slot n, the PUCCH may be deferred to slot that comes no later than slot $n+k_{def}$. If the PUCCH cannot be deferred before the maximum delay, the PUCCH may be dropped.

With multiple active SPS configurations per cell, a SPS HARQ-ACK PUCCH may carry HARQ-ACK bits for multiple SPS configurations having possibly different SPS deferral configurations and maximum values of deferral slot $K_{def}$. In this case, UE behavior may be defined. In the following, symbols that may not be available for PUCCH transmission in the slot may be referred to as "invalid" symbols. One way of defining invalid symbols may be any symbol in the slot that is configured to be semi-static DL symbols or SSB or CORESET #0. Other definitions of invalid symbols may also be possible and may be applied to any of the methods that follow.

Case 1: PUCCH Only Includes A/N of SPS Configurations Configured with Deferral

Method 11-0—Maximum Deferral Slots is Equal to the Maximum of Individual Maximum Deferral Slots If a UE would transmit HARQ-ACK PUCCH in slot n with only SPS HARQ-ACK bits corresponding to M SPS configurations that are configured for deferral, and the PUCCH overlaps with invalid symbols determined by the TDD configuration, then the UE determines a maximum deferral slot $K_d^{overall}$ as the maximum of the values of maximum deferral slots $K_{def}$ over the M SPS configurations. The UE then defers the original PUCCH to a slot that comes no later than slot $n+K_{def}^{overall}$.

With Method 11-0, the maximum deferral slot for a SPS configuration with a relatively small value of $K_{def}$ may be increased so that it will not be dropped. This may unnecessarily increase the latency for that SPS configuration. Alternatively, a maximum deferral slot for all the SPS configurations may be determined based on the minimum value of $K_{def}$.

Method 11-1—Maximum Deferral Slots is Equal to the Minimum of Individual Maximum Deferral Slots.

If a UE would transmit HARQ-ACK PUCCH in slot n with only SPS HARQ-ACK bits corresponding to M SPS configurations that are configured for deferral, and the PUCCH overlaps with invalid symbols determined by the TDD configuration, then the UE determines a maximum deferral slot $K_d^{overall}$ as the minimum of the values of maximum deferral slots $K_{def}$ over the M SPS configurations. The UE then defers the original PUCCH to a slot that comes no later than slot $n+K_{def}^{overall}$. Alternatively, a maximum deferral slot may be determined based on a reference SPS configuration.

Method 11-2—Maximum Deferral Slots is Equal to the Maximum Deferral Slot of a Reference SPS Configuration If a UE would transmit HARQ-ACK PUCCH in slot n with only SPS HARQ-ACK bits corresponding to M SPS configurations that are configured for deferral, and the PUCCH overlaps with invalid symbols determined by the TDD configuration, then the UE determines a maximum deferral slot $K_{def}^{overall}$ as the value of maximum deferral slot $K_{def}$ of a reference SPS configuration among between the M SPS configurations. The reference SPS configuration may be the SPS configuration having the smallest or the largest SPS configuration index, or SPS configuration having the smallest or the largest periodicity. The UE then defers the original PUCCH to a slot that comes no later than slot $n+K_{def}^{overall}$.

A different approach may be taken based on handling individual SPS configurations. With this approach, if the original PUCCH in slot n may include M SPS configurations with the corresponding values of $K_{def}^{(i)}$ for the i-th SPS configuration index such that $K_{def}^{(i)} \leq K_{def}^{(i+1)}$. If the original PUCCH is deferred, a UE first attempts to defer to the slot no later than slot $n+K_{def}^{(1)}$. If the original PUCCH cannot be deferred, the UE drops the HARQ-ACK bits of the first SPS configuration, and attempts to defer the remaining payload to a slot no later than slot $n+K_{def}^{(2)}$. If the UE cannot, the UE further drops the HARQ-ACK bits of the second SPS configuration, and attempts to defer the remaining payload to a slot no later than slot $n+K_{def}^{(3)}$. This process may continue until the PUCCH is successfully deferred, or all the payloads are dropped. This scheme may also be applied to a SPS A/N PUCCH in which some SPS configurations are not configured with deferral by assuming that the value of $K_{def}$ is zero for those configurations.

Although the aforementioned methods may be efficiently employed to define UE behavior in a case of arbitrary combination of SPS configurations present in HARQ-ACK PUCCH, it may also be possible to put a restriction on a gNB to configure such cases. In particular with one approach, a UE may not be expected to transmit SPS HARQ-ACK PUCCH in a slot if A/N bits of different SPS configurations with different values of maximum deferral slot $K_{def}$. That means a gNB may prevent such an event from happening. With another approach, such an event may only not be expected by UE if the PUCCH collides with invalid TDD symbols and cannot be transmitted.

Case 2: PUCCH Includes A/N of SPS Configurations Configured with Deferral and SPS Configurations not Configured with Deferral In the case that some of the SPS configurations having HARQ-ACK bits that are transmitted in the PUCCH that a UE would defer, those SPS configurations do not play a role in determination of maximum deferral slot $K_{def}^{overall}$.

If the original PUCCH resource in slot n cannot be transmitted due to collision with invalid TDD symbols, a UE defers the PUCCH to the next available slot. The next available slots is the slot in which the UE may transmit using the original PUCCH resource after multiplexing with DG HARQ-ACK bits, if any. Since a larger payload may increase the chance of resulting in a resource that collides with TDD invalid symbols, it may be useful to exclude the SPS bits of the SPS configurations that are not configured with deferral for making deferral decision.

Method 11-3—Exclude the SPS Configurations not Configured with Deferral Before Making Deferral Decisions If a UE would transmit HARQ-ACK PUCCH in slot n with only SPS HARQ-ACK bits corresponding to M SPS configurations, and the PUCCH overlaps with invalid symbols determined by the TDD configuration, then the UE first excludes the SPS HARQ-ACK bits of the SPS configurations that are not configured with deferral. The UE then determines the deferral conditions assuming the PUCCH has only the remaining bits to transmit.

Figure 28:
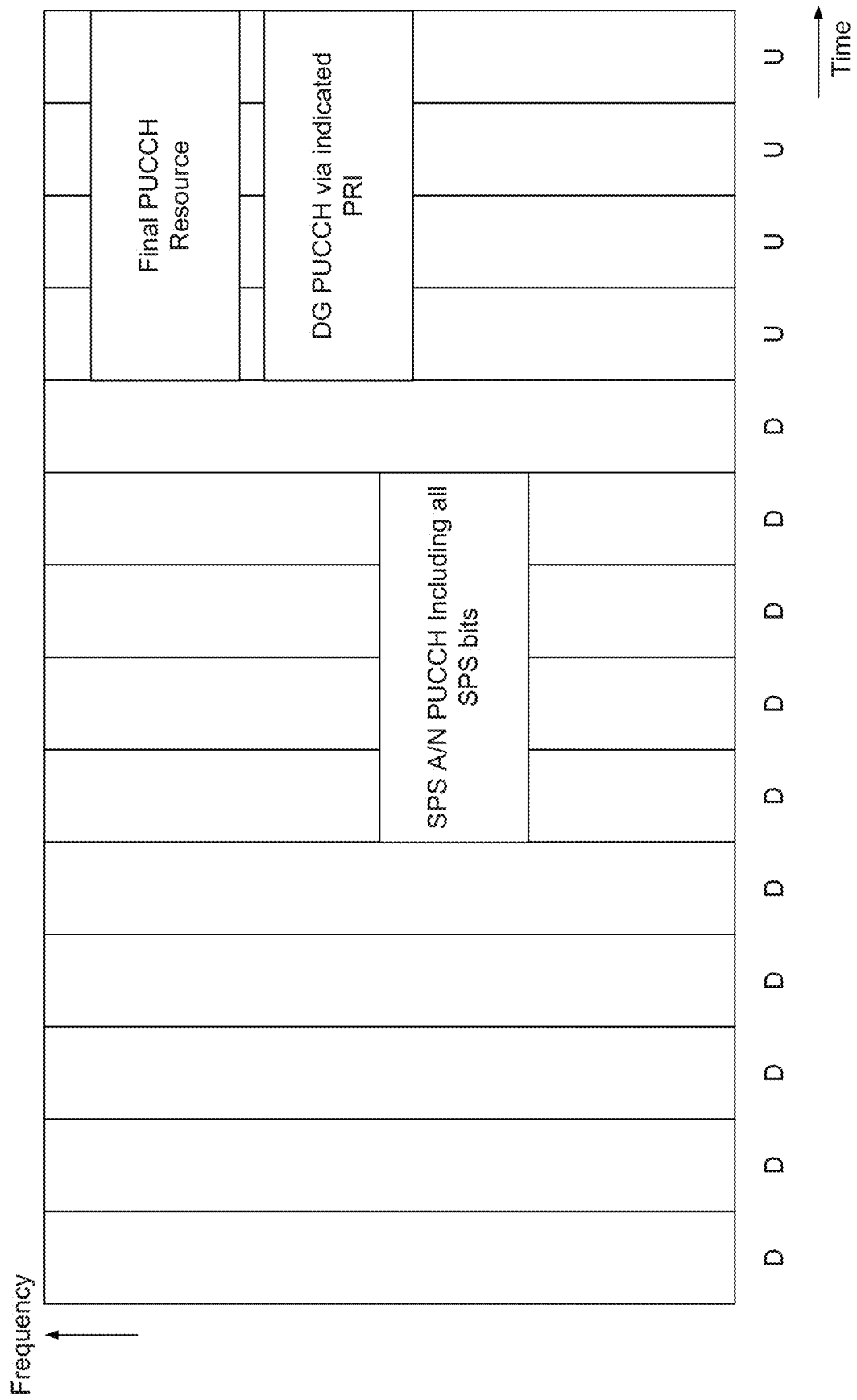
FIG. 28 shows an example scenario in which an original SPS PUCCH cannot be transmitted and would be deferred according to the subject matter disclosed herein.

Case 3: PUCCH Includes A/N of at Least One SPS Configuration Configured with Deferral: Multiplexing with DG HARQ-ACK It has been agreed that in the case of the SPS HARQ-ACK PUCCH cannot be transmitted and would be deferred, a UE makes the deferral decision after multiplexing with any DG HARQ-ACK bits in the slot. FIG. 28 shows an example in which the original SPS PUCCH cannot be transmitted and would be deferred. However, later a gNB has transmitted a DG PDSCH and indicated a PRI on the last four symbols. The final resource may then be calculated based on the indicated PRI and total payload size, i.e., SPS A/N payload size plus DG A/N payload size. Since the final PUCCH resource does not collide with any invalid symbols, the UE does not defer the SPS PUCCH and transmits the multiplexed PUCCH in the final resource.

In the example above, if the SPS or DG A/N payload size were too large, the resulting final PUCCH resource might have collided with invalid symbols, which would result in PUCCH dropping. Although a gNB has control on the number of DG A/N bits that participate in the final PUCCH, it may be desirable to maintain the total number of A/N bits in a low range to avoid collision. In one approach, if there were too many SPS A/N bits corresponding to the configurations not configured with deferral, then the SPS payload size and, in turn, the total payload size would be too large and the final PUCCH could have not been transmitted. To reduce the chance of dropping, only the SPS A/N bits configured with deferral may be considered to determine the final PUCCH resource for transmission. Since this approach may reduce the total number of A/N bits, the likelihood of final PUCCH transmission success becomes greater.

Method 11-4—Exclude the SPS Configurations not Configured with Deferral Before Multiplexing with DG A/N Bits If a UE would transmit HARQ-ACK PUCCH in slot n with only SPS HARQ-ACK bits corresponding to SPS configurations, and the PUCCH overlaps with invalid symbols determined by the TDD configuration, and then the UE is indicated by a DCI to multiplex DG A/N bits in a PUCCH transmission in the same slot, and the UE determines the PUCCH resource based on the indicated PUCCH resource indicator (PRI) in the scheduling DCI and determines a PUCCH resource set based on the total A/N payload size by excluding the SPS A/N bits corresponding to the SPS configuration that are not configured with deferral.

Joint Functionality of SPS A/N PUCCH Deferral and PUCCH Carrier Switching

To ensure a lower latency of SPS A/N deferral, it may be desirable that a PUCCH is deferred to a first amiable slot on any of the PUCCH cells configured for PUCCH carrier switching. To illustrate how carrier switching may reduce latency, suppose the PUCCH cannot be transmitted in certain slot of a first PUCCH cell and hence is deferred to the first available slot. A TDD configuration on this PUCCH cell may be such that the first available slot comes too late. This may either result in PUCCH dropping or a large deferral latency. On the other hand, it may be assumed that there is an available slot right after the current slot, but on a different PUCCH cell. Technically, a UE may transmit PUCCH in that slot and maintain lower latency. In the following, UE behavior may be defined when the UE is configured with both SPS A/N deferral and PUCCH carrier switching.

Method 11-5

If a UE would transmit HARQ-ACK PUCCH in slot n with only SPS HARQ-ACK bits corresponding to SPS configurations, and the PUCCH overlaps with invalid symbols determined by the TDD configuration, then the UE defers the PUCCH transmission to the first available slot on any of the PUCCH cells configured for PUCCH carrier switching. The first available slot may be defined as follows.

Option 1) The first available slot may be defined as the slot with earliest start symbol on any of the target PUCCH cells in which a UE may transmit the SPS A/N PUCCH according to the PUCCH configuration of the target PUCCH cell. If the UE is also indicated to multiplex DG A/N bits on the target PUCCH cell, then the available slot is defined as a slot that is possible for transmission of both SPS A/N bits and DG A/N bits, i.e., a multiplexed final PUCCH resource.

Option 2) The first available slot may be defined as the slot on a reference PUCCH cell. A reference PUCCH cell may be defined as a cell with smallest/largest SCS numerology or given serving cell index, e.g., lowest index.

Capability on the Number of PUCCHs Per Slot

In Rel-16, it is possible that a UE transmits multiple HARQ-ACK PUCCHs per slot due to introduction of sub-slots. The number of HARQ-ACK PUCCHs per sub-slot may still be at most one. There may be numerous UE features determining the number of actual PUCCHs a UE transmits per slot. Although the current UE capabilities may be more specific, it may be assumed that the capability simply indicates a maximum number of actual PUCCHs per slot. As an example, with 7 sub-slots of length 2 in a slot, and a UE reporting a capability of 4 PUCCHs per slot, the UE does not expect to transmit more than 4 PUCCHs per slot, even though there are seven sub-slots in slot.

It may be assumed that there are two PUCCH carriers when a UE is configured with PUCCH carrier switching and the PUCCH carriers may or may not be configured with sub-slot configuration. The following may define some methods for a UE to report the capability.

Method 11-6—Max PUCCH Per Slot Per Cell UE Capability

If a UE is configured with PUCCH carrier switching with 2 PUCCH carriers, then the UE reports $M_1$ and $M_2$ as the maximum number of PUCCHs the UE is capable of transmitting per slot for each PUCCH cell. $M_1$ and $M_2$ may depend on the SCS and/or the sub-slot configuration of the PUCCH cell.

The UE may not be expected to transmit more than $M_1$ PUCCHs per slot of the first cell and more than $M_2$ PUCCHs per slot of the second cell.

Since simultaneous transmission on two cells may have increased UE complexity, it may be natural to define a total limit on the number of PUCCH transmission on the two cells.

Method 11-7—Max PUCCH Per Slot Per Cell UE Capability+Total Limit

If a UE is configured with PUCCH carrier switching with 2 PUCCH carriers, then the UE reports $M_1$ and $M_2$ as maximum number of PUCCHs the UE is capable of transmitting per slot for each PUCCH cell. The UE also reports $M_{total}$ as the maximum number of PUCCHs transmitted on any of the two cells in a slot with smallest SCS between the two cells. $M_1$ $M_2$ and $M_{total}$ may depend on the SCS and/or the sub-slot configuration of the PUCCH cell. The UE may not be expected to transmit more than $M_1$ PUCCHs per slot of the first cell and more than $M_2$ PUCCHs per slot of the second cell. The UE may not be expected to transmit more than $M_{total}$ PUCCHs in a slot duration given by the smallest SCS between the two cells on any of the two cells.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may include many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:
receiving a first Physical Downlink Shared Channel (PDSCH) comprising a Semi-Persistently Scheduled (SPS) PDSCH indicating a first PDSCH resource and a first PUCCH resource for transmitting a first acknowledgement message for the first PDSCH resource in a first PUCCH time slot;
detecting a collision between the first acknowledgement message in the first time slot and at least one symbol due to a Time-Division Duplex (TDD) Uplink/Downline (UL/DL) configuration; and
transmitting the first acknowledgement in a second PUCCH time slot that is different than the first PUCCH time slot.

2. The method of claim 1, further comprising:
receiving a second PDSCH, having a start that is subsequent to a start of the first PDSCH, indicating a second PDSCH resource and a second PUCCH resource for transmitting a second acknowledgement message for the second PDSCH resource in a third PUCCH time slot that is subsequent to the first time slot.

3. The method of claim 2, wherein the first acknowledgement message comprises a first priority and a second acknowledgement message comprising a second priority.

4. The method of claim 3, wherein the second time slot is subsequent to the third time slot, and
wherein the first priority equals the second priority.

5. The method of claim 3, wherein the third time slot is subsequent to the second time slot, and
wherein the first priority equals the second priority.

6. The method of claim 3, wherein the second PUCCH resource ends prior to a start of the first PUCCH resource, and
wherein the first priority is different from the second priority.

7. The method of claim 3, wherein the third time slot is subsequent to the second time slot,
wherein the second PUCCH resource does not end prior to a start of the first PUCCH resource, and
wherein the first priority is different from the second priority.

8. The method of claim 1, further comprising:
transmitting a second PDSCH, having a start that is subsequent to a start of the first PDSCH, indicating a second PDSCH resource and a second PUCCH resource for transmitting a second acknowledgement message for the second PDSCH resource in a third PUCCH time slot that is subsequent to the first time slot,
wherein the first acknowledgement message comprises a first priority and the second acknowledgement message comprising a second priority.

9. The method of claim 8, wherein the second time slot is subsequent to the third time slot, and
wherein the first priority equals the second priority.

10. The method of claim 8, wherein the third time slot is subsequent to the second time slot, and
wherein the first priority equals the second priority.

11. The method of claim 8, wherein the second PUCCH resource ends prior to a start of the first PUCCH resource, and
wherein the first priority is different from the second priority.

12. The method of claim 8, wherein the third time slot is subsequent to the second time slot,
wherein the second PUCCH resource does not end prior to a start of the first PUCCH resource, and
wherein the first priority is different from the second priority.

13. A method comprising:
transmitting a first Physical Downlink Shared Channel (PDSCH) comprising a Semi-Persistently Scheduled (SPS) PDSCH indicating a first PDSCH resource and a first PUCCH resource for transmitting a first acknowledgement message for the first PDSCH resource in a first PUCCH time slot; and
receiving, in response to the transmission, a first acknowledgement in a second PUCCH time slot that is different than the first PUCCH time slot, wherein the transmission in the second PUCCH is based on a detected collision between the first acknowledgement message in the first time slot and at least one symbol due to a Time-Division Duplex (TDD) Uplink/Downline (UL/DL) configuration.

14. A user equipment device comprising:
at least one processing unit;
a memory storage comprising memory-based instructions, the instructions executable by the at least one processing unit to cause:
receiving a first Physical Downlink Shared Channel (PDSCH) comprising a Semi-Persistently Scheduled (SPS) PDSCH indicating a first PDSCH resource and a first PUCCH resource for transmitting a first acknowledgement message for the first PDSCH resource in a first PUCCH time slot;
detecting a collision between the first acknowledgement message in the first time slot and at least one symbol due to a Time-Division Duplex (TDD) Uplink/Downline (UL/DL) configuration; and
transmitting the first acknowledgement in a second PUCCH time slot that is different than the first PUCCH time slot.

15. The user equipment device of claim 14, wherein the instructions, when executed by the at least one processing unit cause:
receiving a second PDSCH, having a start that is subsequent to a start of the first PDSCH, indicating a second PDSCH resource and a second PUCCH resource for transmitting a second acknowledgement message for the second PDSCH resource in a third PUCCH time slot that is subsequent to the first time slot.

16. The user equipment device of claim 15, wherein the first acknowledgement message comprises a first priority and the second acknowledgement message comprising a second priority.

17. The user equipment device of claim 16, wherein the second time slot is subsequent to the third time slot, and
wherein the first priority equals the second priority.

18. The user equipment device of claim 16, wherein the third time slot is subsequent to the second time slot, and
wherein the first priority equals the second priority.

19. The user equipment device of claim 16, wherein the second PUCCH resource ends prior to a start of the first PUCCH resource, and
 wherein the first priority is different from the second priority.

20. The user equipment device of claim 16, wherein the third time slot is subsequent to the second time slot,
 wherein the second PUCCH resource does not end prior to a start of the first PUCCH resource, and
 wherein the first priority is different from the second priority.

* * * * *